United States Patent
Matsui et al.

(10) Patent No.: US 6,890,243 B2
(45) Date of Patent: May 10, 2005

(54) PROCESSING METHOD AND APPARATUS OF DISTAL END OF OPTICAL FIBER

(75) Inventors: Shinsuke Matsui, Machida (JP); Mitsushi Matsunaga, Iruma (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 195 days.

(21) Appl. No.: 10/420,425

(22) Filed: Apr. 22, 2003

(65) Prior Publication Data

US 2003/0198457 A1 Oct. 23, 2003

(30) Foreign Application Priority Data

Apr. 23, 2002 (JP) .................................. P2002-121314
May 20, 2002 (JP) .................................. P2002-145298

(51) Int. Cl.[7] ................................................ B24B 1/00
(52) U.S. Cl. ........................... 451/41; 451/28; 451/312; 451/314; 451/319; 451/320; 451/364; 451/392; 451/909
(58) Field of Search ........................... 451/28, 41, 312, 451/314, 319, 320, 364, 392, 909

(56) References Cited

U.S. PATENT DOCUMENTS

| | | | | |
|---|---|---|---|---|
| 4,802,726 A | * | 2/1989 | Palmquist et al. | 385/85 |
| 5,265,381 A | * | 11/1993 | Takahashi | 451/41 |
| 5,559,916 A | * | 9/1996 | Terao et al. | 385/85 |

* cited by examiner

Primary Examiner—Joseph J. Hail, III
Assistant Examiner—Shantese McDonald
(74) Attorney, Agent, or Firm—Brenda O. Holmes; Kilpatrick Stockton LLP

(57) ABSTRACT

A method and apparatus are disclosed wherein, while holding an optical fiber 1 by an optical fiber holder section 4 so as to serve a distal end 1a of the optical fiber 1 as a free end and holding the distal end 1a of the optical fiber 1 in contact with a grinding flat portion 5b to cause the distal end 1a of the optical fiber 1 to be flexed on the grinding flat portion 5b, reciprocating movement for causing the distal end 1a of the optical fiber 1 to slide on the grinding flat portion 5b in a first sliding direction and an oppositely orientated second sliding direction is relatively implemented a plural number of times between the grinding flat portion 5b and the distal end 1a of the optical fiber 1.

31 Claims, 10 Drawing Sheets

OUTPUT BEAM PATTERN

PROCESSING METHOD AND APPARATUS OF DISTAL END OF OPTICAL FIBER

BACKGROUND OF THE INVENTION

The present invention relates to method and apparatus of processing a distal end of an optical fiber by grinding the distal end of the optical fiber and, more particularly, to method and apparatus of processing an distal end of an optical fiber in a semi-cylindrical curved surface with a given curvature radius (namely, wedge-shaped lens).

Hereinafter, for simplicity, the above-type optical fiber with wedge-shaped lens is defined as a wedge-shaped optical fiber.

In compliance with rapid increase in the amount of communication caused by widely spread Internets, optical communication networks have been expanding at an accelerating pace, and multiplexing of wavelength has been rapidly progressing in optical transmission. In this situation, an optical fiber amplifying technology has been absolutely essential. For instance, in order to amply a light beam within a frequency band of 1.53~1.565 μm, called C-band, an Erbium-Doped Fiber Amplifier (EDFA) has been commonly deployed. Although an excitation optical source for the EDFA has been employed a GaAs semiconductor laser diode, this laser diode has a complicated embedding structure and it is hard to alter a spot size of this laser diode.

For this reason, as shown in FIG. 1, the semiconductor laser diode 30 of this type has a horizontally extending flat opening 30a. A full divergent angle of an output beam 30b emitted outside of the opening 30a has a transverse angle of 4~6° and a longitudinal angle of 27~28° to provide a large aspect ratio. Therefore, an output beam pattern has an elliptical configuration largely extended in a longitudinal direction.

In order to obtain a high performance optical fiber amplifier to enable such an output beam to be efficiently injected into an optical fiber, a technology has been in use which includes processing a distal end of the optical fiber in a wedge shape with a microscopic curvature radius to allow the opening of the optical fiber to be matched with the aspect ratio of the semiconductor laser diode.

FIG. 2 is a perspective view illustrating a coupling condition between the semiconductor laser diode and a wedge-shaped optical fiber. The wedge-shaped optical fiber F is comprised of a core 2, a pair of tapered surfaces 2a, 2b, and a curvature surface 3a processed on a wedge-shaped distal end 3 formed by the pair of tapered surfaces 2a, 2b. A typical shape involves a core diameter of 3.5 μm and a tapering angle 2θ, formed by the pair of tapered surfaces 2a, 2b, of approximately 50°. The curvature surface 3a is formed in a semi-cylindrical shape, and an end face of the core 2 is exposed at a central area of the curvature surface 3a.

Since the curvature surface 3a has a function of a cylindrical lens, allowing an output beam waist of the semiconductor laser diode 30 to be matched with a focal point of the curvature surface 3a enables the output beam 30b to be injected into the core 2 with an extremely high efficiency. Accordingly, the wedge-shaped optical fiber F is effective to be coupled to the semiconductor laser diode 30 having the flat opening 30a.

However, since the opening 30a of the semiconductor diode 30 is extremely thin, in order to high efficiently couple the wedge-shaped optical fiber F with the semiconductor laser diode 30, there is a need for a curvature radius R of the curvature surface 3a to be controlled in an extremely small value of 3~6 μm. Further, the deviation between a ridgeline center of the wedge-shaped distal end 3 and a core center of the core 2 must be controlled at a precision in the submicron order. That is, it is required for the pair of tapered surfaces 2a, 2b to have an extremely high geometric symmetry with respect to the core center of the core 2.

When performing accurate processing the distal end of the optical fiber in a desired form with such a high precision, subsequent to the distal end of the optical fiber being held in pressured contact with a grinding tool by a skilled person in the related art for processing, repeated operations are implemented to carry out corrective processing upon measurement by a shape measuring device or an optical characteristic measuring device.

Alternately, another attempt has been made to fixedly secure the distal end of the optical fiber on a precision stage having a rotational axis whereupon a complicated locus is accurately controlled to allow the distal end of the optical fiber to be formed into a desired shape, as disclosed in Japanese Patent Provisional Publications No. 59-97832, No. 2-42333, No. 8-271763 and No. 11-174236.

SUMMARY OF THE INVENTION

However, a previous method requires a technical stuff who has a skill in a certain level with a resultant issue in that the processing takes longer time and, therefore, is not suited for low cost mass production desired for the wedge-shaped optical fiber for use in the optical fiber amplifier in the situation where the optical fiber amplifier is incorporated in rapid deployment of communication systems such as WAN.

A latter method has various issues arising from requirements for an extremely expensive device and for troublesome and highly accurate operations in mounting the optical fiber to the device and setting the optical fiber at an original point for processing and, therefore, is similarly unsuitable for low cost mass production.

The present invention has been completed in view of the above issues and has an object to provide a wedge-shaped optical fiber processing method and apparatus which do not require troublesome and highly accurate operations, settings and skills and which is suited for low cost mass production through the use of an equipment that is easy in operation and low in cost.

To achieve the above object, a first aspect of the present invention is a processing method of a distal end of an optical fiber comprising, holding an optical fiber to allow a distal end of the optical fiber to serve as a free end, and repeatedly implementing reciprocating movement a plural number of times to cause the distal end of the optical fiber and a grinding surface of a grinding member to slide relative to one another while keeping the distal end of the optical fiber in contact with the grinding surface of the grinding member to cause the distal end of the optical fiber to be flexed in a direction opposite to a direction in which the distal end of the optical fiber moves.

A second aspect of the present invention is a processing apparatus of a distal end of an optical fiber, comprising a holding member holding an optical fiber to allow a distal end of the optical fiber to serve as a free end, a grinding member having a grinding surface for grinding the distal end of the optical fiber, and a reciprocating movement controlling section that controls reciprocating movement to be performed a plural number of times to cause the distal end of the optical fiber and the grinding surface of the grinding member to slide relative to one another while keeping the distal end of the optical fiber in contact with the grinding surface of the grinding member to allow the distal end of the optical fiber to be flexed in a direction opposite to a direction in which the distal end of the optical fiber moves.

A third aspect of the present invention is a processing apparatus of a distal end of an optical fiber comprising, a holding member holding an optical fiber to allow a distal end of the optical fiber to serve as a free end, a grinding member having a grinding surface for grinding the distal end of the optical fiber, a contacting member compelling the distal end of the optical fiber to be brought into contact with the grinding surface, and a reciprocating movement member that controls reciprocating movement to be performed a plural number of times to cause the distal end of the optical fiber and the grinding surface of the grinding member to slide relative to one another while keeping the distal end of the optical fiber in contact with the grinding surface of the grinding member to allow the distal end of the optical fiber to be flexed in a direction opposite to a direction in which the distal end of the optical fiber moves.

A fourth aspect of the present invention is a processing method of a distal end of an optical fiber, comprising holding an optical fiber in a protruding state in a given length, inclining the held optical fiber at a given angle in a first inclining direction with respect to a grinding surface such that a contact angle, defined when a distal end of the held optical fiber is held in pressured contact with the grinding surface to cause the optical fiber to be flexed, between the optical fiber and the grinding surface falls in a given contact angle, moving the grinding surface and the optical fiber relative to one another so as to cause the distal end of the optical fiber to slide on the grinding surface for a given distance in a first travel direction corresponding to the first inclining direction under a condition where the optical fiber is inclined in the first inclining direction, inclining the held optical fiber at a given angle in a second inclining direction, subsequent to a sliding motion for the given distance, such that the contact angle, defined when the distal end of the held optical fiber is held in pressured contact with the grinding surface to cause the optical fiber to be flexed during an inclining motion of the held optical fiber with respect to the grinding surface in the second inclining direction opposite to the first inclining direction, between the optical fiber and the grinding surface falls in a given contact angle, moving the grinding surface and the optical fiber relative to one another so as to cause the distal end of the optical fiber to slide on the grinding surface for a given distance in a second travel direction corresponding to the second inclining direction under a condition where the optical fiber is inclined in the second inclining direction, and repeatedly moving the grinding surface and the optical fiber relative to one another a plural number of times in the first and second travel directions.

A fifth aspect of the present invention is a processing method of a distal end of an optical fiber, comprising holding an optical fiber in a protruding state in a given length, inclining the held optical fiber at a given angle in a first inclining direction with respect to the grinding surface such that a contact angle, defined when a distal end of the held optical fiber is held in pressured contact with the grinding surface to cause the optical fiber to be flexed, between the optical fiber and the grinding surface falls in a given contact angle, moving the grinding surface and the optical fiber relative to one another so as to cause the distal end of the optical fiber to slide on the grinding surface in first travel direction, corresponding to the first inclining direction, for a given distance under a condition where the optical fiber is inclined in the first inclining direction, inclining the held optical fiber with respect to the grinding surface at a given angle in a second inclining direction, subsequent to sliding motion for the given distance, by rotating the held optical fiber in a direction from the first inclining direction toward the second inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, moving the grinding surface and the optical fiber relative to one another so as to cause the distal end of the optical fiber to slide on the grinding surface in second travel direction, corresponding to the second inclining direction, for a given distance under a condition where the optical fiber is inclined in the second inclining direction, inclining the held optical fiber with respect to the grinding surface at a given angle in the first inclining direction, subsequent to sliding motion for the given distance, by rotating the held optical fiber in a direction from the second inclining direction toward the first inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, and consecutively and repeatedly implementing the inclining motions in the first and second inclining directions and the relative movements in the first and second travel directions a plural number of times.

A six aspect of the present invention is a processing method of a distal end of an optical fiber, comprising holding an optical fiber in a protruding state in a given length, inclining the held optical fiber at a given angle in a first inclining direction with respect to the grinding surface such that a contact angle, defined when a distal end of the held optical fiber is held in pressured contact with the grinding surface to cause the optical fiber to be flexed, between the optical fiber and the grinding surface falls in a given contact angle, implementing relative movement between the grinding surface and the optical fiber so as to cause the distal end of the optical fiber to slide on the grinding surface in first travel direction, corresponding to the first inclining direction, for a given distance under a condition where the optical fiber is inclined in the first inclining direction, inclining the held optical fiber with respect to the grinding surface at a given angle in a second inclining direction, subsequent to sliding motion for the given distance, by rotating the held optical fiber in a direction from the first inclining direction toward the second inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, implementing relative movement between the grinding surface and the optical fiber so as to cause the distal end of the optical fiber to slide on the grinding surface in second travel direction, corresponding to the second inclining direction, for a given distance under a condition where the optical fiber is inclined in the second inclining direction, inclining the held optical fiber with respect to the grinding surface at a given angle in the first inclining direction, subsequent to sliding motion for the given distance, by rotating the held optical fiber in a direction from the second inclining direction toward the first inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, and consecutively and repeatedly implementing the inclining motions in the first and second inclining directions and the relative movements in the first and second travel directions a plural number of times.

A seventh aspect of the present invention is a processing method of a distal end of an optical fiber, comprising holding and inclining an optical fiber, in an area above an apex of an angular grinding surface, which is highest in the apex and has both side portions of the apex extend downward, in a protruding state in a given length such that, when swaying the optical fiber about a center of the upper area of the apex of the grinding surface, a distal end of the optical fiber is enabled to be held in abutting contact with slanted portions of the sliding surface, and swaying the held optical fiber at a given sway angle a plural number of times under the protruding state in the given length at the upper area of the apex of the grinding surface about the center of the upper area of the apex of the grinding surface.

An eighth aspect of the present invention is a processing method of a distal end of an optical fiber, comprising holding an optical fiber in an area above a flat grinding surface in a vertical condition under a straightly hanging down state so as to allow a distal end of the optical fiber to be brought into a point contact or out of contact with a flat grinding surface, inclining the held optical fiber at a given angle in a first inclining direction and lowering the held optical fiber for a given distance in the inclined state such that a length between a position, at which the optical fiber is held, and the distal end of the optical fiber is longer than a length between the position, at which the optical fiber is held, and the grinding surface, and repeatedly implementing approaching-separating-synchronous-swaying motion a plural number of times for moving the optical fiber and the grinding surface closer to or separate from one another such that, when the optical fiber is lowered for the given distance, the optical fiber is swayed about a center of the vertical condition of the optical fiber in a first inclining direction and a second inclining direction, opposite to the first inclining direction, through the vertical condition and in the second inclining direction and the first inclining direction through the vertical condition and, when the optical fiber remains in the vertical condition during the swaying movement, a distance between the optical fiber and the grinding surface is remotest whereas, when the optical fiber remains in first and second inclined conditions, the distance between the optical fiber and the grinding surface is closest.

A ninth aspect of the present invention is a processing apparatus of a distal end of an optical fiber, comprising holding an optical fiber in a protruding state for a given length, first inclining means for inclining the held optical fiber at a given angle in a first inclining direction with respect to a grinding surface such that a contact angle, defined when a distal end of the held optical fiber is brought into pressured contact with the grinding surface, between the optical fiber and the grinding surface falls in a given contact angle, first relative motion means for operating the grinding surface and the optical fiber relative to one another so as to cause the distal end of the optical fiber to slide on the grinding surface for a given distance in a first travel direction corresponding to the first inclining direction under a condition where the optical fiber is inclined in the first inclining direction, second inclining means for inclining the held optical fiber with respect to the grinding surface at a given angle in the second inclining direction, subsequent to sliding motion for the given distance, such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, second relative motion means for operating the grinding surface and the optical fiber relative to one another so as to cause the distal end of the optical fiber to slide on the grinding surface for a given distance in a second travel direction corresponding to the second inclining direction under a condition where the optical fiber is inclined in the second inclining direction, and repeating control means for controlling the first and second inclining means and the first and second relative motion means for repeatedly moving the grinding surface and the optical fiber relative to one another a plural number of times in the first and second travel directions.

A tenth aspect of the present invention is a processing apparatus of a distal end of an optical fiber, comprising holding means for holding an optical fiber in a protruding state in a given length, first separating means for moving the optical fiber and a grinding surface relative to one another so as to cause a distal end of the held optical fiber and the grinding surface to separate from one another, first inclining means for inclining the held optical fiber at a given angle in a first inclining direction with respect to the grinding surface under a separated state of the held optical fiber such that a contact angle, defined when the distal end of the held optical fiber is held in pressured contact with the grinding surface to cause the optical fiber to be flexed, between the optical fiber and the grinding surface falls in a given contact angle, first relative motion means for the grinding surface and the optical fiber relative to one another such that the optical fiber and the grinding surface are progressively made closer to cause the distal end of the optical fiber to be progressively brought into pressured contact with the grinding surface while, under a condition where the optical fiber is inclined in the first inclining direction, moving the grinding surface and the optical fiber relative to one another in a first travel direction corresponding to the first inclining direction whereupon, when the contact angle between the optical fiber and the grinding surface falls in the given contact angle, approaching movement is interrupted to allow relative movement to be performed only in the first travel direction to cause the distal end of the optical fiber to slide on the grinding surface for a given distance, second separating means for operating the optical fiber and the grinding surface relative to one another, subsequent to sliding motion for the given distance, so as to cause the distal end of the held optical fiber and the grinding surface to separate from one another, second inclining means for inclining the held optical fiber at a given angle relative to the grinding surface in a second inclining direction such that the contact angle, defined when the distal end of the held optical fiber is held in pressured contact with the grinding surface to cause the optical fiber to be flexed during inclining motion of the held optical fiber with respect to the grinding surface in the second inclining direction opposite to the first inclining direction, between the optical fiber and the grinding surface falls in a given contact angle, second relative motion means for the grinding surface and the optical fiber relative to one another such that the optical fiber and the grinding surface are progressively made closer to cause the distal end of the optical fiber to be progressively brought into pressured contact with the grinding surface while, under a condition where the optical fiber is inclined in the second inclining direction, moving the grinding surface and the optical fiber relative to one another in a second travel direction corresponding to the second inclining direction whereupon, when the contact angle between the optical fiber and the grinding surface falls in the given contact angle, approaching movement is interrupted to allow relative movement to be performed only in the second travel direction to cause the distal end of the optical fiber to slide on the grinding surface for a given distance, and repeating control means for controlling the first and second separating means, the first and second inclining means and the first and second relative motion means so as to consecutively and repeatedly implement the first and second separating motions, inclining motions in the first and second inclining directions and relative motions in the first and second travel directions a plural number of times.

An eleventh aspect of the present invention is a processing apparatus of a distal end of an optical fiber, comprising holding means for holding an optical fiber in a protruding state in a given length, first inclining means for inclining the held optical fiber at a given angle in a first inclining direction with respect to the grinding surface such that a contact angle, defined when a distal end of the held optical fiber is held in pressured contact with the grinding surface to cause the optical fiber to be flexed, between the optical fiber and the grinding surface falls in a given contact angle, first relative motion means for operating the grinding surface and the optical fiber relative to one another so as to cause the distal end of the optical fiber to slide on the grinding surface in first travel direction, corresponding to the first inclining direction, for a given distance under a condition where the optical fiber is inclined in the first inclining direction, first rotating means for inclining the held optical fiber with respect to the grinding surface at a given angle in a second inclining direction, subsequent to sliding motion for the given distance, by rotating the held optical fiber in a direction from the first inclining direction toward the second inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, second relative motion means for operating the grinding surface and the optical fiber relative to one another so as to cause the distal end of the optical fiber to slide on the grinding surface in second travel direction, corresponding to the second inclining direction, for a given distance under a condition where the optical fiber is inclined in the second inclining direction, second rotating means for inclining the held optical fiber with respect to the grinding surface at a given angle in the first inclining direction, subsequent to sliding motion for the given distance, by rotating the held optical fiber in a direction from the second inclining direction toward the first inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle, and repeating control means for controlling the first and second rotating means and the first and second relative motion means so as to consecutively and repeatedly implement inclining motions in the first and second inclining directions and relative motions between the grinding surface and the optical fiber in the first and second travel directions a plural number of times.

A twelfth aspect of the present invention is a processing apparatus of a distal end of an optical, comprising holding means for holding and inclining an optical fiber, in an area above an apex of an angular grinding surface, which is highest in the apex and has both side portions of the apex extend downward, in a protruding state in a given length such that, when swaying the optical fiber about a center of the upper area of the apex of the grinding surface, a distal end of the optical fiber is enabled to be held in abutting contact with slanted portions of the sliding surface, and swaying means for swaying the held optical fiber at a given sway angle a plural number of times under the protruding state in the given length at the upper area of the apex of the grinding surface about the center of the upper area of the apex of the grinding surface.

A thirteenth aspect of the present invention is a processing apparatus of a distal end of an optical fiber, comprising holding means for holding an optical fiber in an area above a flat grinding surface in a vertical condition under a straightly hanging down state so as to allow a distal end of the optical fiber to be brought into a point contact or out of contact with a flat grinding surface, inclining and lowering means for inclining the held optical fiber at a given angle in a first inclining direction and lowering the held optical fiber for a given distance in the inclined state such that a length between a position, at which the optical fiber is held, and the distal end of the optical fiber is longer than a length between the position, at which the optical fiber is held, and the grinding surface, and approaching-separating-synchronous-swaying means for repeatedly implementing approaching-separating-synchronous-swaying motion a plural number of times for moving the optical fiber and the grinding surface closer to or separate from one another such that, when the optical fiber is lowered for the given distance, the optical fiber is swayed about a center of the vertical condition of the optical fiber in a first inclining direction and a second inclining direction, opposite to the first inclining direction, through the vertical condition and in the second inclining direction and the first inclining direction through the vertical condition and, when the optical fiber remains in the vertical condition during the swaying movement, a distance between the optical fiber and the grinding surface is remotest whereas, when the optical fiber remains in first and second inclined conditions, the distance between the optical fiber and the grinding surface is closest.

DETAILED DESCRIPTION OF THE PREFERRED INVENTION

Figure 13:
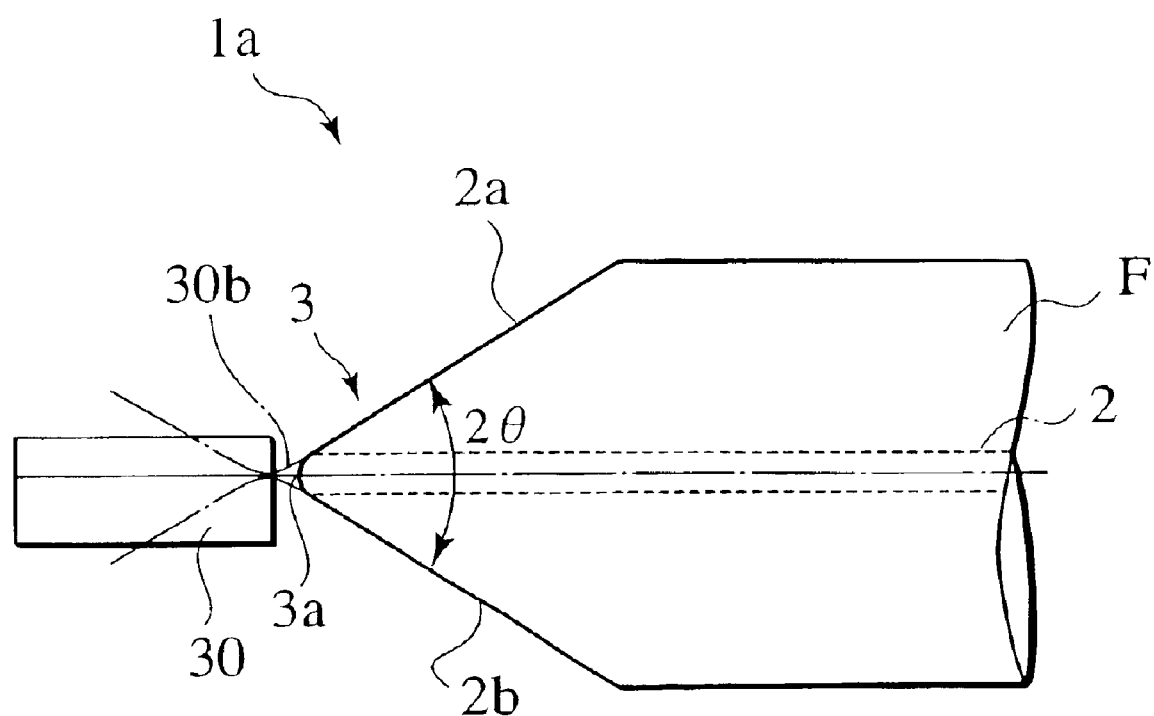
FIG. 13 is a side view illustrating a structure of a wedge-shaped optical fiber processed by the processing apparatus that carries out the wedge-shaped optical fiber processing method according to the present invention.

Hereinafter, various embodiments of the present invention are described with reference to the drawings. FIG. 13 is a side view illustrating a structure of wedge-shaped optical fiber processed by a processing apparatus that carries out a processing method of the wedge-shaped optical fiber according to the present invention.

The wedge-shaped optical fiber F is comprised of a core 2, a pair of tapered surfaces 2a, 2b processed at a distal end of the core 2, and a curvature surface 3a with a curvature radius R processed at a wedge shaped distal end 3 formed by the pair of tapered surfaces 2a, 2b.

Figure 3A:
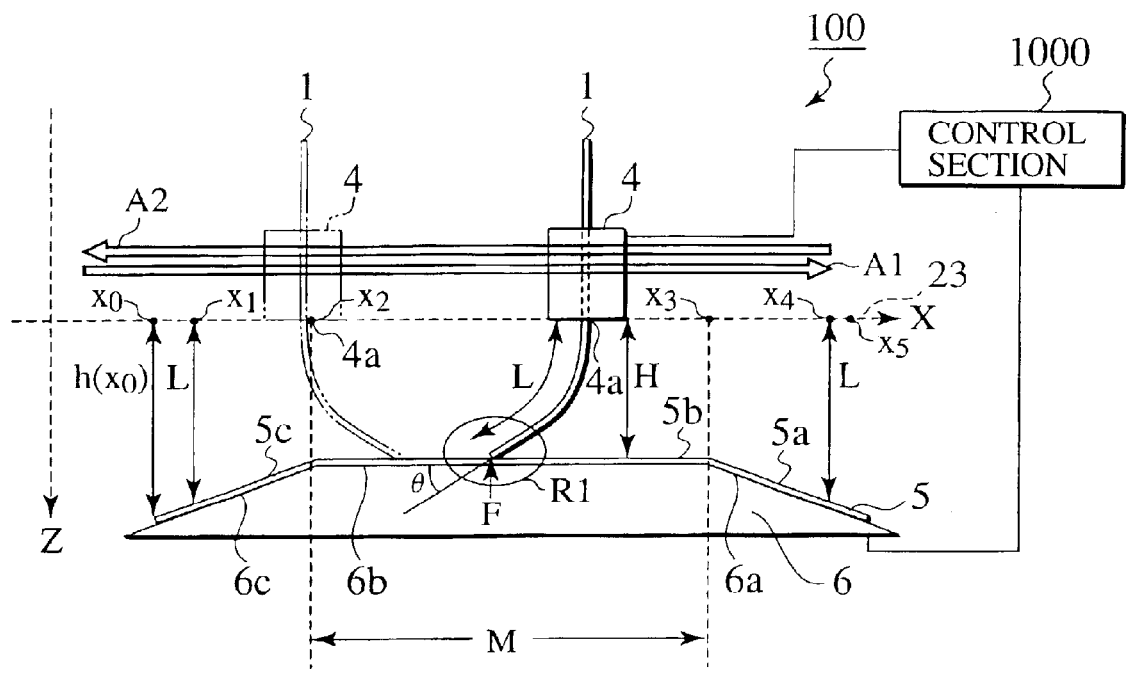
FIG. 3A is a side view illustrating a schematic structure of a processing apparatus for carrying out a wedge-shaped optical fiber processing method of a first embodiment according to the present invention.
Figure 3B:
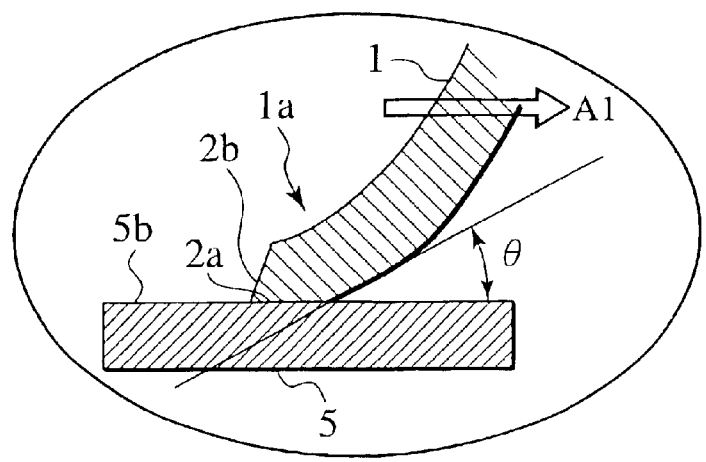
FIG. 3B is an enlarged view of a sliding region R1 encircled in FIG. 3A.

A wedge-shaped optical fiber processing method of the present invention for processing such a wedge-shaped optical fiber and related processing apparatus are described below in detail. FIG. 3A is a side view illustrating a schematic structure of the processing apparatus to carry out the wedge-shaped optical fiber processing method of a first embodiment according to the present invention, and FIG. 3B is an enlarged view of a sliding region R1 shown in FIG. 3A.

The wedge-shaped optical fiber processing apparatus 100 of the embodiment is comprised of a trapezoidal grinding stand 6 composed of a flat wall section 6 and first and second slanted wall sections 6a, 6b disposed at both outside ends of the flat wall section 6a, an optical fiber holder section 4 that allows an optical fiber 1 to be mounted and held, and a control section 1000 that controls operations of the optical fiber holder section 4 and the grinding stand 6. In addition, a grinding flat surface portion 5b and first and second grinding slanted surface portions 5a, 5c, each made of a grinding film on which alumina fine powders are coated, are formed over the flat wall section 6b and the first and second slanted wall sections 6a, 6c of the grinding stand 6, respectively. However, the presently filed embodiment is described with reference to an example in which only the grinding flat surface portion 5b on the grinding film 5 has a grinding capability. Also, the optical fiber holder section 4 has an optical fiber fixing end portion 4a, for fixedly supporting the optical fiber 1, which is located on a line 23 displaced from the grinding flat surface portion 5b by a vertical distance H. In the presently filed embodiment, the grinding flat surface portion 5b is located in parallel with the line 23 and hence the vertical distance H is constant.

The processing method of the optical fiber 1 using the wedge-shaped optical fiber processing apparatus 100 of the presently filed embodiment is described as follows.

For a subsequent description, for instance, as shown in FIG. 3A, an X-coordinate is defined along the line 23, and a Z-coordinate is defined in a direction intersecting the X-coordinate. A way of defining the Z-coordinate in a positive direction is determined for each embodiment to provide an ease of description. It is to be noted that, as occasion demands, by using this XZ coordinate, the positions of the optical fiber holder section 4 (the optical fiber fixing end portion 4a) or a distal end 1a of the optical fiber 1 are represented. Also, in a case where description requires no specific use of the Z-coordinate, the positions of the optical fiber holder section 4 (the optical fiber fixing end portion 4a) or the distal end 1a of the optical fiber 1 are represented only in terms of the X-coordinate.

As shown in FIG. 3A, a vertical distance h between the optical fiber fixing end portion 4a and the grinding film 5, under which the optical fiber fixing end portion 4a rests at a position x on the line 23, can be expressed as h (x). That is, the vertical distance h is a function of the position x. Thus, the above-described relation of distance between the optical fiber fixing end portion 4a and the grinding flat surface portion 5b is expressed as h (x)=H (=constant), x $2 \leq x \leq x3$, x3−x2=M (which is a length of the grinding surface 5b in a direction along the X-coordinate).

First, the optical fiber holder section 4 is mounted under a condition where at a position x0 the optical fiber 1 protrudes in a vertically downward direction from the optical fiber fixing end portion 4a in a given length L. Here, a protruding length L of the optical fiber 1 is preset to be longer (h (x0)=L>H) than the vertical distance H between the optical fiber fixing end portion 4a and the grinding flat surface portion 5b.

Next, the optical fiber holder section 4 begins to travel from the position x0 and horizontally moves along the line 23 in a first travel direction as shown by an arrow A1 while keeping the optical fiber 1 in the above-described condition. If the optical fiber holder section 4 moves across a position x1 (h (x1)=L), the distal end 1a of the optical fiber 1 is progressively brought into contact with the second grinding flat surface 5c of the grinding film 5 and begins to be flexed.

After the distal end 1a of the optical fiber 1 rides onto the grinding flat surface portion 5b of the grinding film 5, as shown in FIG. 3B, the distal end 1a of the optical fiber 1 is brought into contact with the grinding flat surface portion 5b and flexed in a direction opposite to a sliding direction (i.e., a first sliding direction A1). When this takes place, the distal end 1a of the optical fiber 1 is inclined with respect to the grinding flat surface portion 5b with a certain contact angle θ, thereby generating a reaction force F on the distal end 1a of the optical fiber 1 due to flexing. As a result of this reaction force, the distal end 1a of the optical fiber 1 slides on the grinding flat surface portion 5b and ground to form a tapered surface 2a on the distal end 1a of the optical fiber 1. Here, a sliding distance in which the distal end 1a of the optical fiber 1 moves in sliding contact with the grinding flat surface portion 5b is equal to the length M in the X-coordinate direction of the grinding surface 5b. A processing angle of the distal end 1a of the optical fiber 1 is determined by the contact angle θ between the distal end 1a of the optical fiber 1 and the grinding flat surface portion 5b (such that, as shown in FIG. 13, the processing angle of the wedge-shaped distal end portion 3 to be formed on the distal end 1a of the optical fiber stands finally 2θ).

Then, the optical fiber holder section 4 further horizontally moves in the first travel direction, as shown by the arrow A1, along the line 23 and, when the distal end 1a of the optical fiber 1 comes across the first grinding slanted surface portion 5a, the flexing of the distal end 1a of the optical fiber 1 is progressively released.

When the optical fiber holder section 4 further horizontally moves in the first travel direction, as shown by the arrow A1, along the line 23 to go across the position x4 (h (x4)=L), the distal end 1a of the optical fiber 1 separates from the first grinding slanted surface portion 5a of the grinding film 5. Then, at the position x5 (h (x5)>L), a direction in which the optical fiber holder section 4 moves is reversed, and the optical fiber holder section 4 moves in a second travel direction as shown by an arrow A2 in a similar step to allow the other surface, which is symmetric with the tapered surface 2a, formed on the distal end 1a of the optical fiber 1 to be ground to form a tapered surface 2b.

Repeatedly performing such reciprocating movement several tens times enables a pair of tapered surfaces 2a, 2b to be formed on the distal end 1a of the optical fiber 1 with a vertical angle of 2θ. This processing method contemplates to utilize a materialistic uniformity of the optical fiber with a favorable repeatability in flexing and, further, alternately repeat grinding operations on one and the other sides, to be formed in the pair of tapered surfaces 2a, 2b, of the distal end 1a of the optical fiber 1 thereof one by one in a minimal amount, thereby realizing a highly accurate wedge-shaped optical fiber F with a simple apparatus.

While, in the above description, the processing method has been described is with reference to an example where the optical fiber holder section 4 horizontally moves with respect to the grinding stand 6, it is needless to say that, on the contrary, under the same condition as that of the above embodiment, the grinding stand 6 may horizontally move in the directions as shown by the arrows A1 (for the first travel direction) and A2 (for the second travel direction) with respect to the optical fiber holder section 4 or both of these may horizontally and mutually move with respect to one another.

It is apparent that, although such relative horizontal movement of the optical fiber holder section 4 and the grinding stand 6 are controlled by the control section 1000, control of such movement does not require a complicated control algorithm.

As set forth above, by holding the optical fiber 1 by the optical fiber holder section 4 in a way to allow the distal end 1a of the optical fiber 1 to be kept in contact with the grinding flat surface portion 5b and causing the optical fiber holder section 4 or the grinding stand 6 to horizontally move relative to one another in the directions as shown by the arrows A1, A2, the distal end 1a of the optical fiber 1 is enabled to slide on the grinding flat surface portion 5b.

Such sliding movement, that is, reciprocating movement, which compels sliding movement to be linearly and repeatedly performed a plural number of times for causing the distal end 1a of the optical fiber 1 to slide on the grinding flat surface portion 5b in the first sliding direction as shown by the arrow A1 and in the second sliding direction as shown by the arrow A2 opposite to the first sliding direction, is carried out between the grinding flat surface portion 5b and the distal end 1a of the optical fiber 1 relative to one another while compelling the distal end 1a of the optical fiber 1 to be kept in contact with the grinding flat surface portion 5b and flexed in a direction opposite to the sliding direction.

By the use of a high materialistic and mechanical uniformity as well as a high geometric precision of the optical fiber 1, such sliding movement enables the distal end 1a of the optical fiber 1 to be processed in a desired wedge shape with a high precision. In a grinding process enabled to obtain a microscopic mirror surface which is an objective to be achieved in the presently filed embodiment, the processing precision is determined by a processed quantity and a processed shape. The processed quantity is determined in proportion to a product of a load on which the processing is performed and the amount (a relative sliding distance between a grinding surface and a workpiece to be processed) of relative contact, and the processed shape is determined by the amount of processing and an interfering surface exposed in an interference between the grinding surface and the workpiece to be processed. Accordingly, in the processing method of the presently filed embodiment, accurate processing can be achieved by precisely controlling these amounts.

Further, during reciprocating movement wherein the distal end 1a of the optical fiber 1 is caused to slide on the grinding flat surface portion 5b, at a processing point where the distal end 1a of the optical fiber 1 is kept in contact with the grinding flat surface portion 5b, an urging pressure is generated against the grinding flat surface portion 5b due to flexing of the distal end 1a of the optical fiber 1 and this forms processing load. Although this load is also generated by a elasticity caused by the flexing of the distal end 1a of the optical fiber 1, as set forth above, since the optical fiber 1 has the materialistic uniformity and the favorable geometric precision, such an elastic force can be controlled in a high repeatability with a high precision. Also, the sliding distance is strictly determined by a length in which the optical fiber 1 traverses the grinding surface having the grinding capability and, in the presently filed embodiment, its length is equal to a value M. In addition, although the tapered angle $2\theta$, defined by the pair of tapered surfaces 2a, 2b processed at the distal end 1a of the optical fiber 1, is determined by the contact angle $\theta$ between the distal end 1a of the optical fiber 1 and the grinding flat surface portion 5b, such a contact angle $\theta$ can be strictly controlled in a flexed shape. On the basis of such a principle, the processing method of the presently filed embodiment makes it possible to allow the pair of tapered surfaces 2a, 2b to be precisely processed on the distal end 1a of the optical fiber 1.

As set forth above, because a deviation between a ridge-line center of the wedge-shaped distal end portion 3, formed on the distal end 1a of the wedge-shaped optical fiber 1, and the core center of the core 2 needs an accuracy of the submicron order, while the pair of tapered surfaces 2a, 2b have an extremely high geometrical symmetry with respect to the core center of the core 2, the processing method of the presently filed embodiment makes it possible to perform processing of the wedge shape with an extremely high geometric symmetry.

That is, as shown in FIGS. 3A and 3B, the optical fiber 1 is vertically held by the optical fiber holder section 4 in the given height H from the grinding flat surface portion 5b, and the optical fiber holder section 4 (holding the optical fiber 1) is reciprocated above the grinding flat surface portion 5b with respect to the horizontal axis (X-axis) without being rotated with respect to the vertical axis (Z-axis). In FIG. 3A, it appears that the distal end 1a of the optical fiber 1 presents an identically flexed shape in a right and left symmetry wherein, when horizontally moving the optical fiber holder section 4 along the arrow A1, the tapered surface 2a is processed on one side (at a right side) of the distal end 1a of the optical fiber 1 and, when horizontally moving the optical fiber holder section 4 in an opposite direction (in the direction along the arrow A2: the second travel direction), the tapered surface 2b is processed on the other side (at a left side) of the distal end 1a of the optical fiber 1.

Further, during one reciprocating movement, the respective tapered surfaces 2a, 2b relatively move on the grinding flat surface portion 5b for the same distance. That is, the reciprocating movement is repeated plural number of times such that the amount of grinding effectuated in the first sliding direction and the amount of grinding effectuated in the second sliding direction, opposite to the first sliding direction, are equal to one another. Consequently, processing in one reciprocating movement enables the pair of tapered surfaces 2a, 2b to be processed in the same processed quantity and in the same shape, thereby providing a capability of processing the wedge shape with an extremely high geometric symmetry. In normal practice, the reciprocating movement is carried out plural number of times in order to reach the wedge shape. In this case, the pair of tapered surfaces 2a, 2b are finely processed one by one to avoid an adverse affect caused by variation (such as a deteriorated capability of the grinding surface due to processed works) in a processing status caused by an elapse of time.

Furthermore, in the presently filed embodiment, as shown in FIG. 3A, the grinding film 5 is structured in a trapezoidal shape with both the right and left sides being slanted downward such that only the grinding flat surface portion 5b has a grinding capability. Accordingly, during reciprocating movement, if the distal end 1a of the optical fiber 1 is displaced from the right and left regions of the grinding flat surface portion 5b of the grinding film 5 and moves on the first or second grinding slanted surface portions 5a, 5c, the distal end 1a of the optical fiber 1 is brought out of contact with the grinding flat surface portion 5b and enabled to extend straight. And, under such a straightly extending condition, if the distal end 1a of the optical fiber 1 moves in the opposite direction again toward the grinding flat surface portion 5b, at the time when the distal end 1a of the optical fiber 1 is brought into abutting contact with the first or second grinding slanted surface portions 5a, 5c, the distal end 1a of the optical fiber 1 is flexed again and brought into contact with the grinding flat surface portion 5b to be ground. And, during movement of the distal end 1a of the optical fiber 1 in contact with the grinding flat surface portion 5b, the distal end 1a of the optical fiber 1 is ground while in the flexed condition caused by the grinding flat surface portion 5b, whereas, when the distal end 1a of the optical fiber 1 passes across the grinding flat surface portion 5b and moves on the second or first grinding slanted surface portions 5c, 5a of the grinding film 5, the distal end 1a of the optical fiber 1 is out of contact with the grinding flat surface portion 5b to be free and, thus, the distal end 1a of the optical fiber 1 extends straight. That is, a length of the grinding flat surface portion 5b is a given limited length with respect to a direction in which reciprocating movement is implemented.

In such a way, during processing at one time, arrangement is such that the optical fiber 1 moves from the slanted surfaces (i.e., the first and second slanted surface portions 5a, 5c) with no processing capabilities at both the outside areas of the grinding flat surface portion 5b and enters a region of the grinding flat surface portion 5b to pass through the grinding flat surface portion 5b while in the flexed state whereupon the distal end 1a of the optical fiber 1 separates from the second and first grinding slanted surface portions 5c, 5a of the grinding film 5. As a result, when the distal end 1a of the optical fiber 1 enters from the first and second grinding slanted surface portions 5a, 5c into the grinding flat surface portion 5b, a preceding linear optical fiber 1 is enabled to be smoothly flexed with no stress being applied thereto, while providing an ease of switching over between forward and rearward movements at positions on both sides (that is, on the first and second sliding slanted surfaces 5a, 5b) where the distal end 1a of the optical fiber 1 remains in an extending state.

As set forth above, according to the presently filed embodiment, since reciprocating movement between the grinding flat surface portion 5b and the distal end 1a of the optical fiber 1 is relatively implemented plural number of times so as to allow the distal end 1a of the optical fiber 1 to slide on the grinding flat surface portion 5b in the first and second sliding directions while compelling the distal end 1a of the optical fiber 1 to be held in contact with the grinding flat surface portion 5b to be flexed and the distal end 1a of the optical fiber 1 is processed in the wedge shape, the present invention has no need for skills as required in the related art practice and makes it possible to achieve a mass production at a low cost. In addition, the distal end 1a of the optical fiber 1 can be formed with an extremely small, semi-cylindrical curved lens that has a high geometrical symmetry, thereby enabling formation of the wedge-shaped optical fiber F with a high-precision wedge-shaped lens enabled to be coupled to a semiconductor laser diode 30 with a high efficiency.

Further, according to the presently filed embodiment, since the reciprocating movement is repeated a plural number of times such that the amount to be ground in the first sliding direction and the amount to be ground in the second sliding direction becomes equal to one another, it is possible for the distal end 1a of the optical fiber 1 to be accurately formed with a small semi-cylindrical curved surface lens with a high symmetry.

Figure 4A:
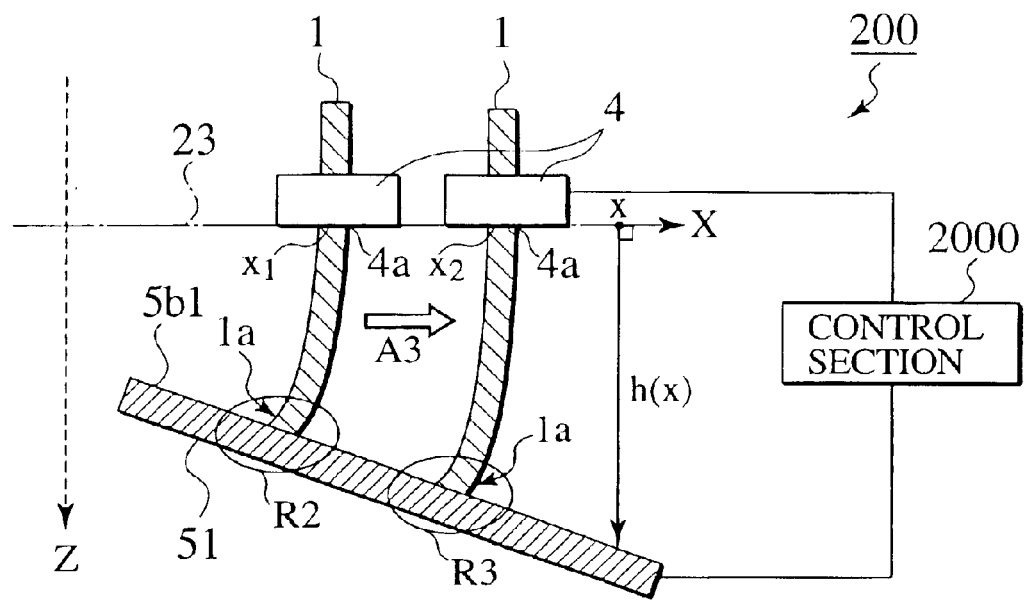
FIG. 4A is a view illustrating a wedge-shaped optical fiber processing method of a second embodiment according to the present invention.
Figure 4B:
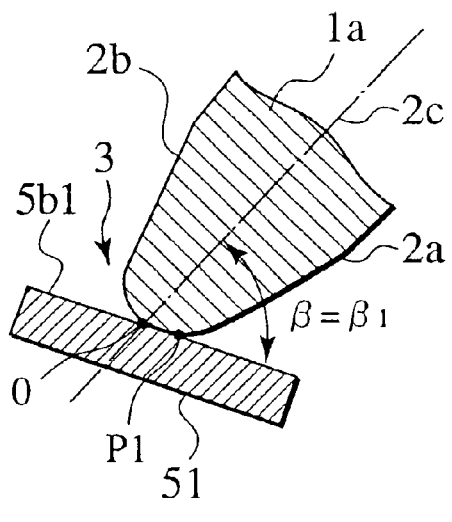
FIGS. 4B, 4C are enlarged views of sliding regions R2 and R3 encircled in FIG. 3A.
Figure 4C:
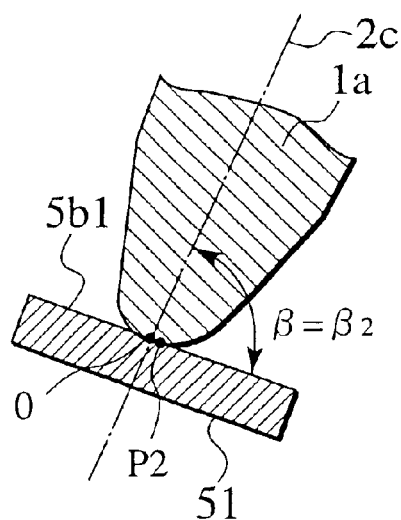

Next, referring to FIGS. 4A, 4B, a method of processing a wedge-shaped optical fiber according to a second embodiment of the present invention is described. FIG. 4A is a view illustrating a wedge-shaped optical fiber processing method of the second embodiment of the present invention, and FIGS. 4B, 4C are enlarged views of sliding regions R2 and R3 shown in FIG. 4A, respectively.

In a wedge-shaped optical fiber processing apparatus 200 of the presently filed embodiment, as shown in FIG. 4A, a grinding film 51 formed with a grinding flat surface portion 5b1 is disposed in a slanted condition with respect to the line 23, on which the optical fiber fixing end portion 4a of the optical fiber holding section 4 in which the optical fiber 1 is mounted and held rests. As a result of this arrangement, a vertical distance h (x) between the line 23, and the grinding flat surface portion 5b is a continuous function and monotone increasing function of x (in this case, h(x) is a linear function because the grinding surface 5b is flat). That is, in FIG. 4A, h (x1)<h (x2). Additionally, the wedge-shaped optical fiber processing apparatus 200 is equipped with a control section 2000 that controls operations of the optical fiber holder section 4 and the grinding stand 6.

Accordingly, the distal end 1a of the optical fiber 1, vertically extending downward below the optical fiber holder section 4 at a position where the optical fiber holder section 4 rests on the position x1, is held in abutting engagement with the grinding flat surface portion 5b at a stronger force to be flexed in a larger extent than that experienced where the optical fiber holder section 4 remains in the position x2. As a consequence, the distal end 1a of the optical fiber 1, under which the optical fiber holder section 4 rest on the position x1, tends to be held in contact with the grinding flat surface portion 5b at a greater urging force than that experienced when the optical fiber holder section 4 remains in the position x2, and the distal end 1a of the optical fiber 1 is caused to be deeply inclined as shown in FIG. 4B at a distal end angle β(=β1) that is smaller than the distal end angle β(=β2) (see FIG. 4C). Here, although the distal end angle β indicates an angle defined between a central axis 2c of the core 2, in the vicinity of the distal end 1a of the optical fiber 1, and the grinding flat surface portion 5b, of course, the above-described contact angle θ presents a similar tendency. As a result, a contact point P1 (that is, a point at which grinding is to be processed) between the wedge shaped distal end portion 3, defined between the pair of tapered surfaces 2a, 2b (processed by the processing method of the first embodiment) processed on the distal end 1a of the optical fiber 1, and the grinding flat surface portion 5b is displaced from a center point O (a distal end center of the distal end of the optical fiber 1) for a far distance than that of a contact point P2 (see FIG. 4C) where the optical fiber holder section 4 rest on the position x2.

Accordingly, holding the optical fiber 1 and sliding the distal end 1a of the optical fiber 1 on the grinding flat surface portion 5b1, that is disposed under the slanted condition as shown in FIG. 4A, enables the distal end angle β to be continuously varied. In such a way, the wedge shaped distal end portion 3 defined by the pair of tapered surfaces 2a, 2b processed on the distal end 1a of the optical fiber 1 can be processed in a curved surface, thereby making it possible for such a wedge shaped distal end 3 portion to be accurately processed in a curvature surface 3a with the curvature radius R.

As a consequence, by performing such curved-surface processing on the distal end 1a of the optical fiber 1 in right and left symmetry using the grinding flat surface portion 5b formed in a symmetric reversed V-shape or a convex shape forming the right and left symmetric slanted surfaces, it is possible to form the semi-cylindrical curved lens having the high geometric symmetry as shown in FIG. 13.

Also, in FIG. 4A, although the grinding film 51 forming the grinding flat surface portion 5b1 takes the form a flat configuration, the presence of its formation in a curved configuration makes it possible to accurately process a curved lens in a non-semi-cylindrical shape, resulting in a capability for a further high coupling characteristic to be expected. In such a case, the vertical distance h (x) between the optical fiber fixing end portion 4a and the grinding curved surface portion of the grinding film 51 forms a non-linear function of x.

Furthermore, although such relative separating movement between the optical fiber holder section 4 and the grinding stand 6 is controlled by the control section 2000, it is clear that, when controlling such movement, there is no need for a complicated algorithm.

As previously mentioned above, according to the present invention, since the vertical distance h between the line 23 and the grinding flat surface portion 5b1 continuously varies, the degree (forming the contact point) in which the distal end 1a of the optical fiber 1 and the grinding flat surface portion 5b1 comes to be continuously varied. This enables the distal end 1a of the optical fiber 1 to be accurately formed with a small, semi-cylindrical curved surface having a high geometric symmetry.

With the presently filed embodiment, a processing method can be economically performed in an easy manner at a high precision by the use of a precision of the optical fiber 1 per se without a need for accurate positioning of the optical fiber prior to processing and for combination between a skilled technology and measurement. The use of such a processing method in a similar manner enables a mass production to be realized at a low cost to allow a batch processing for a large number of optical fibers at once.

Figure 5A:
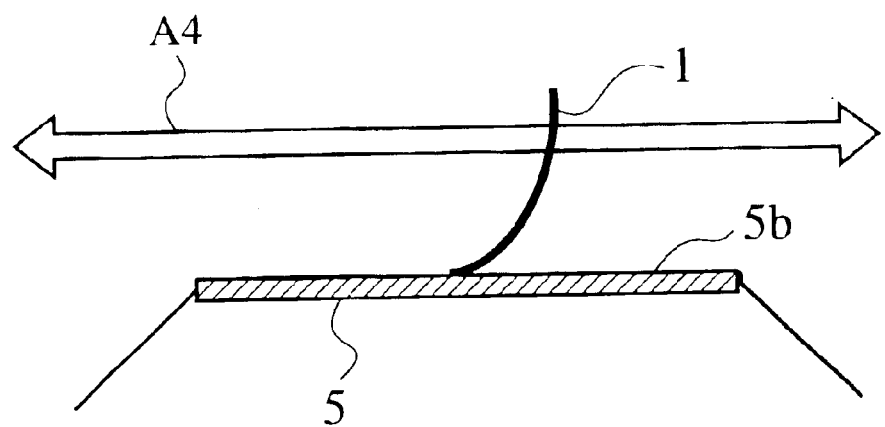
FIG. 5A is a view illustrating a first coarse processing step of the wedge-shaped optical fiber processing method to be carried out by a processing apparatus of the first embodiment.

Next, referring to FIGS. 5A, 5B, practical processing steps are described below. FIG. 5A is a view illustrating first coarse processing step in a wedge-shaped optical fiber processing method to be carried out by the processing apparatus of the first embodiment, and FIG. 5B is a view illustrating second finishing-processing step subsequent to the processing step of FIG. 5A to be implemented in the wedge-shaped optical fiber processing method using the processing apparatus of the second embodiment.

First, during the first processing step, coarse processing is implemented and, during such coarse processing, as shown in FIG. 5A, the distal end 1a of the optical fiber 1 is processed in a tapered shape using the grinding film 5 structured in the trapezoidal shape whose both outward ends are slanted downward like in the structure shown in FIG. 3A, that is, using the grinding flat surface portion 5b formed on the upper surface of the trapezoidal grinding film 5 to have the grinding capability. During such tapering-processing, the distal end 1a of the optical fiber 1 is processed at a high speed by the grinding flat surface portion 5b formed of relatively coarse abrasive grain (of alumina in a grain size of 5 μm), thereby forming the pair of tapered surfaces 2a, 2b on the distal end I a of the optical fiber 1.

Figure 5B:
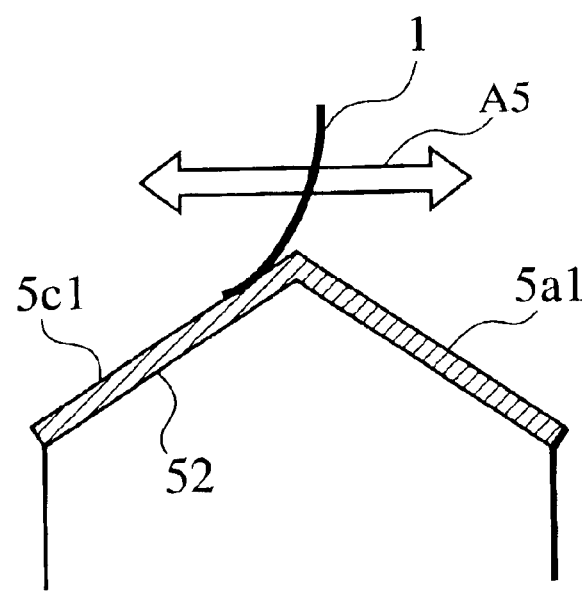
FIG. 5B is a view illustrating a second finishing processing step, followed by the step of FIG. 5A, of the wedge-shaped optical fiber processing method to be carried out by the processing apparatus of the second embodiment.

Subsequently, during the second finishing-processing, processing is implemented to perform mirror-surface finishing at the wedge-shaped distal end portion 3 defined by the pair of tapered surfaces 2a, 2b formed on the distal end 1a of the optical fiber 1 using first and second grinding slanted surface portions 5a1, 5c1, that employ fine silica abrasive grain, of the grinding film 5 whose center is sharp like an apex of a triangle, i.e., in a symmetric reverse V-shape, as shown in FIG. 5B, thereby forming the curvature surface 3a with the curvature radius R at the wedge-shaped distal end portion 3.

Figure 6:
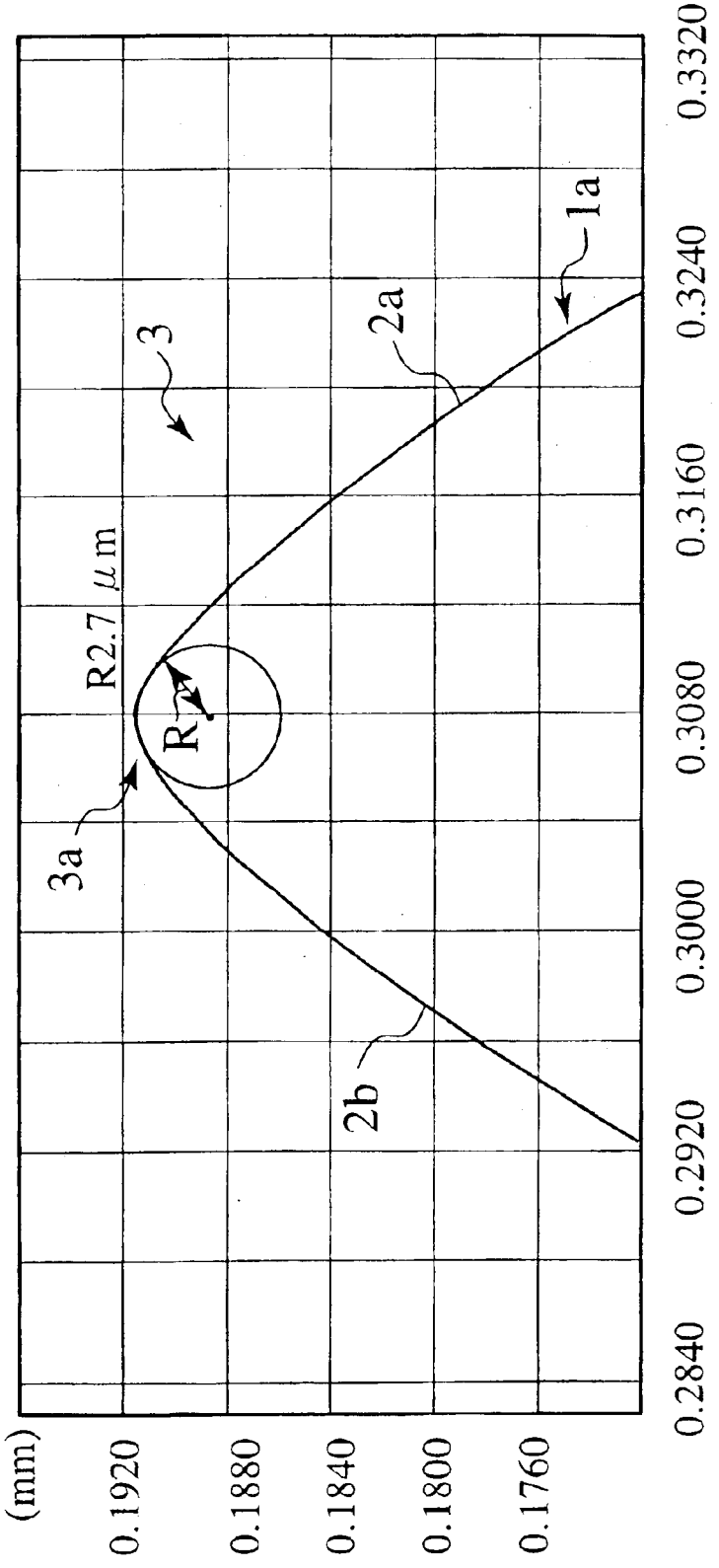
FIG. 6 is a graph illustrating a evaluation result of a contact needle type shape measuring device that measured a shape of a distal end of the wedge-shaped optical fiber obtained upon performing first and second processing steps shown in FIGS. 5A, 5B.

FIG. 6 is a view illustrating an evaluation result obtained by measuring the shape of the distal end 1a of the wedge-shaped optical fiber F, processed in the first and second processing steps set forth above, using a needle-contact type shape measuring device. As shown in the figure, the curvature surface 3a with the curvature radius R≈2.7 µm was obtained at the distal end 1a of the optical fiber 1. This curvature surface 3a takes the form processed in a mirror-surface finish through the use of fine silica abrasive grain. From this figure, it appears that the distal end 1a of the wedge-shaped optical fiber F processed using the processing method of the presently filed embodiment has an extremely high geometric symmetry with respect to a core center of the core 2. That is, the shape of the distal end 1a (formed with the curvature surface 3a) of the optical fiber 1 is in a line symmetry in terms of a straight line x=0.3080. This curvature surface 3a plays as a cylindrical lens, with a focal point of which an emitting beam waist of the semiconductor laser diode 30 is matched, and the emitting light beam 30b can be charged into the core 2 at an extremely high efficiency.

As set forth above, according to the processing method of the presently filed embodiment, it is possible to realize the processing of the wedge-shaped optical fiber with a high accuracy, and using two steps involving the coarse processing and the finishing-processing enables the processing to be performed in a practical length of time period. Also, it is understood that even in the result of concurrent batch processing performed by holding a plurality of optical fibers, all of the optical fibers can be subjected to the same processing, resulting in a capability of realizing a mass production in a batch processing for a large number of optical fibers. Additionally, it is confirmed that the processing of the presently filed embodiment has an ability of obtaining the substantially same processed shapes with no significant adverse affect on flexing shapes of the optical fibers even in the existence of a difference in the amounts of protrusions of the optical fibers or in held heights of the optical fibers in the order of several tens µm. Also, it is conceivable to use a covered optical fiber as the optical fiber for protection thereof during processing depending on a shape to be processed or a condition to be processed and, for this purpose, the covered optical fiber may include an optical fiber subjected to metal coating, carbon coating and Polymer Skin Coating (PSC), an optical fiber formed in a normal primary covering or an optical fiber additionally further covered in another way. That is, the presently filed embodiment concerns the provision of a preliminary step of coating resilient raw material onto the optical fiber prior to carrying the above-described reciprocating operations.

Further, a processing method in combination of the methods of the first and second embodiments may be used which includes preparing an abrasive over an entire surface of the trapezoidal grinding stand 6 in order to concurrently achieve tapering-processing and a tip-sphere processing. That is, the first and second grinding slanted surface portions 5a, 5c of the grinding film 5 shown in FIG. 3A may be arranged so as to have grinding capabilities for thereby implementing the first processing step on the grinding flat surface portion 5b of the grinding film 5 and subsequently implementing the second finishing-processing steps on the first and second grinding slanted surface portions 5a, 5c. In order to enhance a high geometric symmetry when processing the curvature surface 3a at the distal end 1a of the optical fiber 1, it is required for the first and second grinding slanted surface portions 5a, 5c to be in right and left symmetry and this may be similarly applied to a case where the slanted surface is curved.

Furthermore, as variation in shape to be processed, implementing the processing of the fiber 1 in two directions intersecting one another enables the optical fiber to have a pseudo tip-sphere-shaped optical fiber function. Moreover, when processing in another direction, the curvature radius R of the curvature surface 3a of the distal end 1a of the optical fiber 1 can be altered. Also, for instance, in FIG. 5B, processing the optical fiber 1 without providing abrasive on one of the first and second grinding slanted surface portions 5a, 5c enables an inclined semi-cylindrical lens to be formed.

Figure 7:
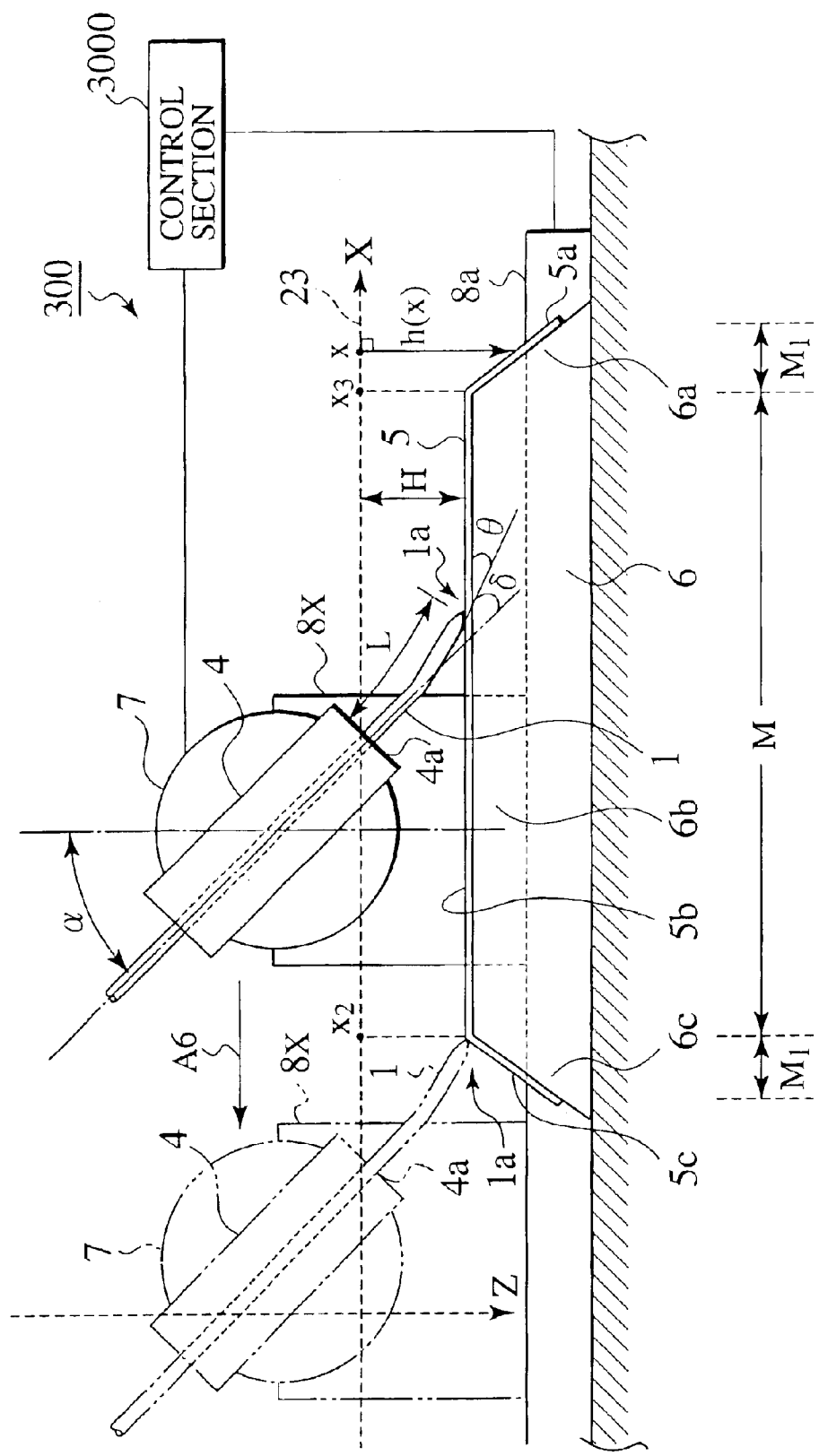
FIG. 7 is a side view illustrating a schematic structure of a processing apparatus for carrying out a wedge-shaped optical fiber processing method of a third embodiment according to the present invention.

Next, referring to FIG. 7, a third embodiment of the present invention is described below in detail. FIG. 7 is a side view illustrating a schematic structure of a processing apparatus for carrying out a method for processing a wedge-shaped optical fiber according to a third embodiment of the present invention.

A wedge-shaped optical fiber processing apparatus 300 of the presently filed embodiment is further comprised of, in addition to the component elements of the wedge-shaped optical fiber processing apparatus 100 of the first embodiment shown in FIG. 3A, a rotating mechanism 7 that carries an optical fiber holder section 4 for rotational thereof, a moving mechanism 8X for moving the rotating mechanism 7 in a horizontal direction relative to a flat surface portion 6b of a grinding stand 6, and a guide mechanism 8a that guides the moving mechanism 8X. Further, in the presently filed embodiment, in addition to a grinding flat surface portion 5b on the flat surface portion 6b of the grinding stand 6, both grinding slanted surface portions 5a, 5c on first and second slanted wall portions 6a, 6c of the grinding stand 6 have grinding capabilities. Furthermore, the wedge-shaped optical fiber processing apparatus 300 is equipped with a control section 3000 that controls operations of the rotating mechanism 7 ad the moving mechanism 8X.

Figures 8, 9:
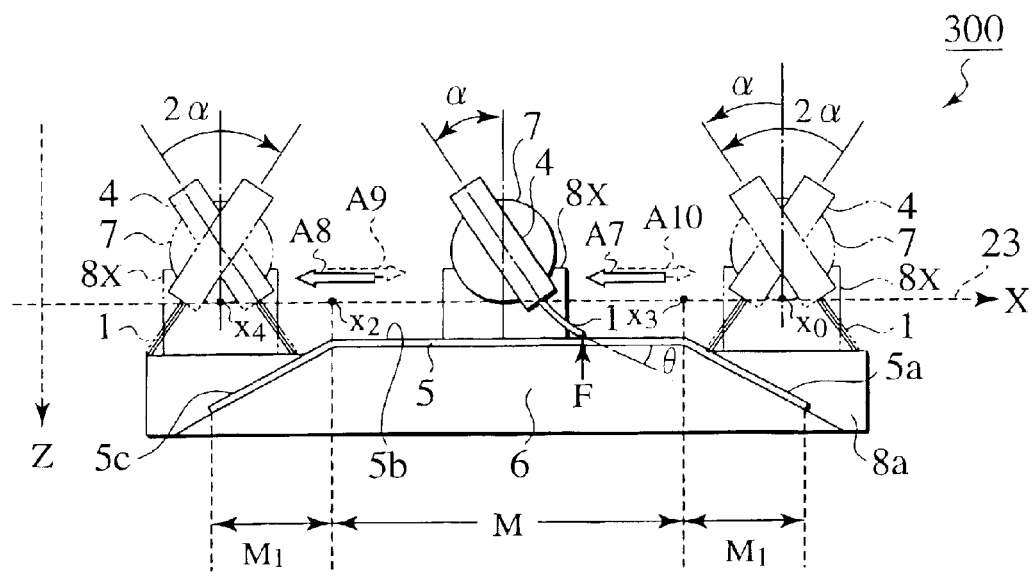
FIG. 8 is a side view for illustrating the wedge-shaped optical fiber processing method of the third embodiment shown in FIG. 7.
FIG. 9 is a side view illustrating a schematic structure of a processing apparatus for carrying out a wedge-shaped optical fiber processing method of a fourth embodiment according to the present invention.

Next, a method of processing an optical fiber using the wedge-shaped optical fiber processing apparatus 300 of the presently filed embodiment is described below in detail with reference to FIG. 8. FIG. 8 is a side view for illustrating the wedge-shaped optical fiber processing method of the third embodiment shown in FIG. 7. Hereinafter, the same component parts as those of the first embodiment bear the same reference numerals which are referred to when explained.

First, as shown at right side in FIG. 8, the moving means 8X is moved to an upper position x0 of the first grinding slanted surface portion 5a of the grinding film 5 formed on the grinding stand 6. Then, an optical fiber 1 is mounted and held in the optical fiber holder section 4 under a condition wherein, at the position x0, the optical fiber is caused to vertically protrude downward from the optical fiber fixing end portion 4a by a given length L, with the optical fiber holder mechanism 4 being installed on the rotating mechanism 7. When this takes place, as shown in FIG. 7, the protruding length L of the optical fiber 1 is determined to be longer than a vertical distance H between the optical fiber fixing end portion 4a and the grinding flat surface 5b (h (x0)=L>H).

Subsequently, the optical fiber holder section 4 holding the optical fiber 1 is rotated by the rotating mechanism 7, thereby allowing the optical fiber holder section 4 to be inclined in the first travel direction as shown by an arrow A7 shown in FIG. 8 at a given inclining angle α. That is, this rotational (inclining) direction is a direction in which an upper portion of the optical fiber 1 lays down in the first travel direction.

Also, as shown in FIG. 7, supposing a contact angle θ is defined as the angle between the distal end 1a of the optical fiber 1 and the grinding flat surface portion 5b when compelling the distal end 1a of the optical fiber 1 to be brought into pressured contact with the grinding flat surface portion 5b of the grinding film 5 to cause the optical fiber 1 to be flexed is θ, a flexing angle δ of the optical fiber 1 inclined at an angle α by the rotation mechanism 7, is δ=90°−θ−α. For example, if the contact angle θ when grinding the pair of tapered surfaces 2a, 2b defining a vertical angle of 50° is 25° and the optical fiber 1 is inclined at an angle of 45°, the angle δ defined by the flexed optical fiber 1 night be 20°. As a consequence, in contrast to the wedge-shaped optical fiber processing method of the first embodiment where the flexing angle δ of the optical fiber 1 must be 65°, the wedge-shaped optical fiber processing method of the presently filed embodiment suffices to be less than one third to provide a capability of remarkably eliminating the optical fiber 1 from being broken.

Figure 1:
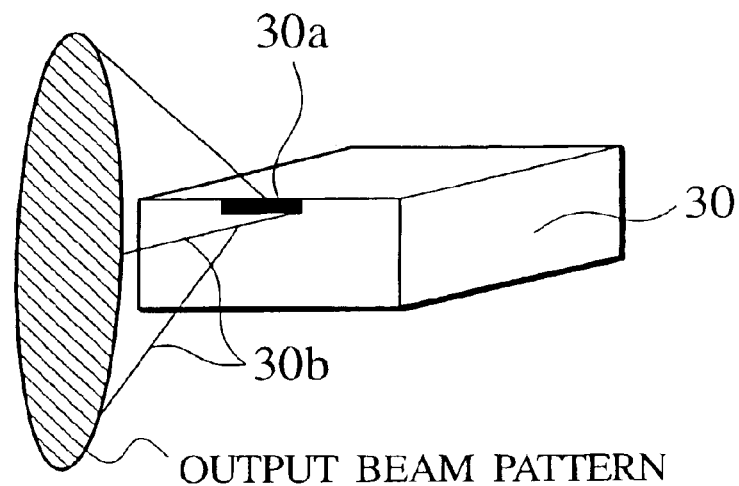
FIG. 1 is a view illustrating a pattern of an output beam emitted from a semiconductor laser diode with a wavelength of 980 nm.
Figure 2:
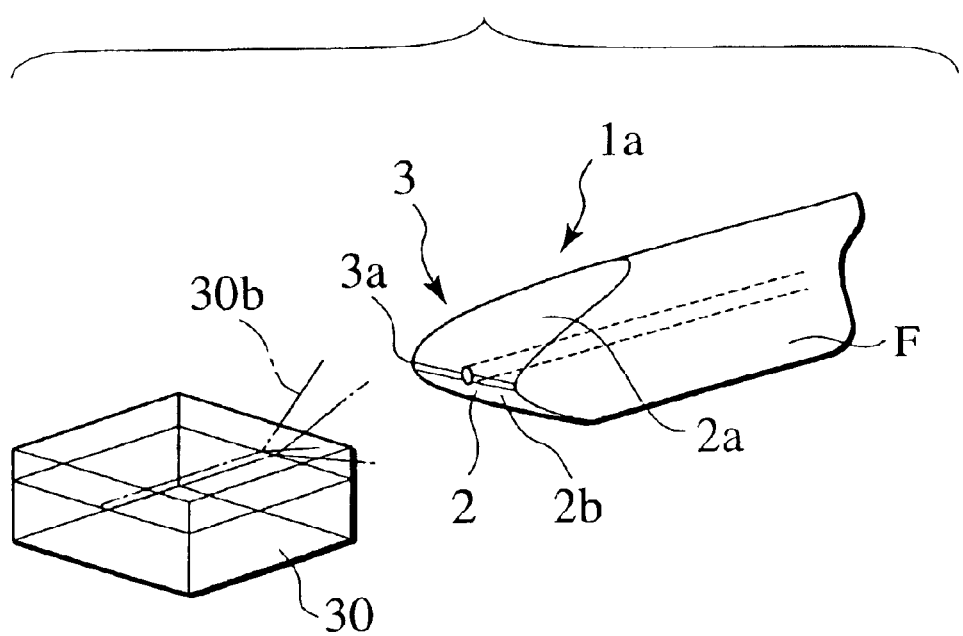
FIG. 2 is a perspective view illustrating a principle of coupling between the semiconductor laser diode and a wedge-shaped optical fiber.

As set forth above, after the optical fiber holder section 4 that holds the optical fiber 1 has been inclined at the given angle α, when horizontally moving the moving mechanism 8X along the guide mechanism 8a in the first travel direction, as shown by the arrow A7 shown in FIG. 2, from the first grinding slanted surface portion 5a toward the second grinding slanted surface portion 5c through the grinding flat surface portion 5b, the distal end 1a of the optical fiber 1 is progressively brought into pressured contact with the first grinding slanted surface portion 5a of the grinding film 5, resulting in a progressive increase in the flexing of the distal end 1a of the optical fiber 1.

Further, as the moving mechanism 8X is moved to cause the optical fiber 1 to be horizontally moved to an upper area of the grinding flat surface portion 5b of the grinding film 5, the distal end 1a of the optical fiber 1 has the maximum degree of flexing and such a flexing occurs at the distal end 1a of the optical fiber 1 generates a reaction force F, thereby allowing one side of the optical fiber 1 to be ground. Also, when this occurs, the contact angle between the distal end 1a of the optical fiber 1 and the grinding flat surface portion 5b of the grinding film 5 is θ. That is, as the moving mechanism 8X is horizontally moved while kept in the contact condition between the distal end 1a of the optical fiber 1 and the grinding flat surface portion 5b of the grinding film 5, one side of the distal end 1a of the optical fiber 1 is slightly ground at a time, thereby forming the tapered surface 2b at a small angle θ.

Furthermore, as shown by an arrow A8 in FIG. 8, as the moving mechanism 8X is horizontally moved to cause the distal end 1a of the optical fiber 1 to rest on the second grinding slanted surface portion 5c of the grinding film 5, the flexing of the distal end 1a of the optical fiber 1 is progressively released to allow the contact point (that is, a point at which grinding is processed) between the distal end 1a of the optical fiber 1 and the second grinding slanted surface portion 5c of the grinding film 5 to be progressively shifted to a tip center side of the distal end 1a of the optical fiber 1, thereby permitting a distal end portion of the tapered surface 2b to be slightly ground at a time in a curved shape. That is, the existence of such a smooth shift of the point at which grinding is to be processed allows the distal end portion of the tapered surface portion 2b formed on the distal end 1a of the optical fiber 1 to be slightly ground at a time in the curved shape (under a situation corresponding to a case where the distal end 1a of the optical fiber 1 is inclined in an opposite direction as shown in FIGS. 4B, 4C).

Moreover, as the moving mechanism 8X is horizontally moved in the direction as shown by the arrow A8, the distal end 1a of the optical fiber 1 separates from the second grinding slanted surface portion 5c of the grinding film 5. Thus, under a condition (in a position x4) where the distal end 1a of the optical fiber 1 separates from the second grinding slanted surface portion 5c of the grinding film 5, if the direction in which the moving mechanism 8 is moved is reversed from the first travel direction to the second travel direction opposite thereto as shown by an arrow A9 in FIG. 8 and the upper portion of the optical fiber 1 is rotated at an angle of −2α in the second inclining direction opposite to the first inclining direction, the optical fiber 1 is held under a condition in which the optical fiber 1 is inclined at an angle of −α in the second inclining direction with respect to the vertical axis of the moving means 8X.

As the optical fiber 1 is held in the second inclined condition in such a way and, subsequently, the moving mechanism 8X is horizontally moved along the guide mechanism 8a in the second travel direction, as shown by the arrow A9 in FIG. 8, from the second grinding slanted surface portion 5c of the grinding film 5 to the first grinding slanted surface portion 5a through the grinding flat surface portion 5b, the distal end 1a of the optical fiber 1 is progressively brought into pressured contact with the second grinding slanted surface portion 5c of the grinding film 5 to cause the distal end 1a of the optical fiber 1 to be progressively flexed at an increased degree. Further, as the optical fiber 1 is horizontally moved by the moving mechanism 8X to the grinding flat surface portion 5b of the grinding film 5 in the second travel direction, the distal end 1a of the optical fiber 1 has the maximum flexing and the other side of the distal end 1a of the optical fiber 1 is slightly ground at a time, thereby forming the tapered surface 2a with the small angle θ. Furthermore, as the distal end 1a of the optical fiber 1 horizontally moves in the second travel direction, as shown by an arrow A10 shown in FIG. 8, and comes to the first grinding slanted surface portion 5a of the grinding film 5, the flexing state of the distal end 1a of the optical fiber 1 is gradually released to allow the contact point, between the distal end 1a of the optical fiber 1 and the first grinding slanted surface portion 5a to progressively shift to the tip center side of the distal end 1a of the optical fiber 1 whereby a distal edge portion of the tapered surface portion 2a, formed at the distal end 1a of the optical fiber 1, is slightly ground at a time in the curved shape (corresponding to the situations shown in FIGS. 4B, 4C). Moreover, as the distal end 1a of the optical fiber 1 further horizontally moves in the second travel direction, the distal end 1a of the optical fiber 1 separates from the first grinding slanted surface portion 5a. Under such a condition, as the moving direction is reversed into the first travel direction at the position x0 and the upper portion of the optical fiber 1 is rotated at the angle 2α by the rotating mechanism 7 in the first inclining direction, the optical fiber 1 is held under the condition in which the optical fiber 1 is inclined at the angle α in the first inclining direction with respect to the vertical axis.

By repeatedly implementing the above-described reciprocating movement, a plural number of times, for instance several tens times, through cooperative movements of the rotating mechanism 7 and the moving mechanism 8X, which involve horizontal movements of the optical fiber 1 in the first and second travel directions and the inclining movements of the optical fiber 1 in the first and second inclining directions, the distal end 1a of the optical fiber 1 can be ground in symmetry by a small quantity at a time for thereby forming the pair of tapered surfaces 2a, 2b with the vertical angle 2θ owing to the grinding effect of the grinding flat surface portion 5b. In addition, grinding the distal end 1a of the optical fiber 1 with the first and second grinding slanted surface portions 5a, 5c allows the curvature surface 3a, with the fine curvature radius R, to be formed on the wedge-shaped distal end portion 3 that are defined by the pair of tapered surfaces 2a, 2b. Repeatedly implementing such reciprocating movement a plural number of times enables a semi-cylindrical-shape curved lens to be formed at the distal end 1a of the optical fiber 1.

And, since the presently filed embodiment is provided with the mechanism for holding the optical fiber 1 in the inclined condition, the optical fiber 1 does not need to be largely flexed, with no occurrence of breakage in the optical fiber 1. That is, since the optical fiber 1 per se is inclined at the angle α by the rotating mechanism 7, the angle δ required for the optical fiber 1 being flexed during the processing operation satisfies δ=90°−θ−α and there is no need for flexing the optical fiber 1 at a larger degree than that required in the case with no rotating mechanism 7, thus reducing the bending moment in that extent to avoid occurrence of the breakage. Also, to the extent in which the degree of flexing becomes small, since the protruding length L of the optical fiber 1 can be shortened, the reaction force F to be exerted to the distal end can be settled at a large value, resulting in an improvement in a grinding efficiency. Accordingly, an improved yield is obtained, resulting in a capability of performing a wedge shape processing with a high production efficiency.

Further, when processing the distal end 1a of the optical fiber 1 so as to form the pair of tapered surfaces 2a, 2b with the vertical angle θ, since the contact angle between the distal end 1a of the optical fiber 1 and the grinding flat surface portion 5b needs to be θ, this can be uniquely determined by the protruding length L of the optical fiber 1, the vertical distance H between the grinding flat surface portion 5b, and the optical fiber holder section 4 and the rotational angle or the inclined angle α. That is, a value of the contact angle θ is preliminarily derived as parameters of the protruding length L, the vertical distance H and the inclined angle α based on a mechanical analysis of an elastic body or an experimental test and, further, preliminary operations are made to experimentally evaluate the relation between the flexing of the optical fiber 1 and an occurrence probability of breakage and the relation between the reaction force F caused by the flexing of the optical fiber 1 and a grinding efficiency, thereby enabling the protruding length L, the vertical distance H and the inclined angle α to be easily determined at respective appropriate values suitable for an arbitrary wedge shape processing at the vertical angle 2θ.

Furthermore, in the processing method of the presently filed embodiment, even in the presence of the optical fiber 1 whose protruding length L is minimized as small as possible to cause its flexing to reach zero, in principle, the wedge shape processing can be performed by setting the inclined angle α of the rotating mechanism 7 to a value of 90°−θ. In comparison with such a case, a first effect resulting from the appropriate flexing by the use of a uniform and high repeatability in the flexing state of the optical fiber 1 is discussed as follows. The sliding stand 6 has a surface configuration that is not completely flat and has swellings and roughness in the order of approximately at least 1 μm. Also, while the grinding film 5 is comprised of a grinding sheet normally composed of a plastic film coated with abrasive, also, there is a probability for the film thickness and the abrasive thickness to locally have variations in the order of several tens μm. Accordingly, it is hard to avoid the grinding film 5 from having variation in height in the order of several μm due to a superimposed effect between a flatness error caused in the grinding stand 6 and unevenness in thickness of the grinding film 5. In a case where the protruding length L is set to zero and the distal end 1a of the optical fiber 1 is held at a high rigidity, an extremely strong reaction force F instantaneously generates when the distal end 1a of the optical fiber 1 horizontally moves and is brought into abutting contact with a swelled area locally swelled on the grinding film 5 in height in the several μm order, causing the distal end 1a of the optical fiber 1 to be intruded in that extent and to be ground (in some cases, resulting in a high occurrence probability of breakage of the distal end 1a of the optical fiber 1). Also, a resulting reaction causes the swelled area of the grinding film 5 to be shaved out. As a consequence, during a returning phase, the swelled area becomes small and the amount of grinding relatively becomes small, with a resultant formation of an asymmetric wedge shape. Since the optical fiber for use in EDFA has a core diameter of approximately 3.5 μm and an error between the ridgeline center of the wedge-shaped distal end portion 3 and the core center of the core 2 falls in an allowable value of less than 0.5 μm, the above-described asymmetric shape forms a fatal error. On the contrary, in a case where the optical fiber 1 is extended in the protruding length L and the distal end 1a of the optical fiber 1 is flexibly held, even if the distal end 1a of the optical fiber 1 horizontally moves and is brought into abutting engagement with the locally swelled area, in the height of several μm, of the grinding film 5, a resulting displacement component is absorbed by flexibility of the optical fiber 1, resulting in less occurrence of the reaction force F. Accordingly, there is no probability for the distal end 1a of the optical fiber 1 to be broken or intruded, making it possible to obtain a highly precise wedge shape, that has an extremely high symmetry, at a high yield.

A second effect resulting from the use of the uniform and high repeatability in the flexing state of the optical fiber 1 concerns to a case where, if the protruding length L is set to zero and the distal end 1a of the optical fiber 1 is held at a high rigidity, when realizing a smooth shift of the grinding-processing point required for allowing the wedge-shaped distal end portion 3 of the optical fiber 1 to be formed in a smooth curvature radius R, accurate angular control is needed so as to allow the distal end 1a of the optical fiber 1 to be kept in contact with the grinding surface 5 with a uniform force such that its contact point smoothly and progressively shifts to a tip center side of the distal end 1a of the optical fiber 1, and complicated control is obligatory in that the position at which the optical fiber 1 is held must be accurately controlled in the submicron order depending on progress of the grinding. On the contrary, in a case where the optical fiber 1 is provided with the protruding length L to allow the distal end 1a of the optical fiber 1 to be softly held, simple operation that merely needs horizontal travel of the optical fiber 1 as set forth above enables the grinding-processing point to smoothly shift on the tip center of the distal end 1a of the optical fiber 1 to permit the tip center to be formed with a curvature surface with a smooth curvature radius. As described above, the above-described effect results from the use of the uniform and high repeatability of the optical fiber 1 and forms the reason why such a simplified and highly accurate processing can be realized.

Further, it is clear that, while such horizontal and rotating movements of the optical fiber holder section 4 (holding the distal end 1a of the optical fiber 1) and the grinding stand 6 relative to one another is controlled by the control section 3000, when controlling such movements, there is no need for a complicated algorithm.

As set forth above, according to the presently filed embodiment, since the processing method of the present invention performs operations a plural number of times wherein the distal end 1a of the optical fiber 1, that is held in the protruding state in the given length L, is inclined in the first inclining direction to cause the contact angle between the distal end 1a of the optical fiber 1 and the grinding flat surface portion 5b to form the given contact angle θ, and relatively moved in the first travel direction to cause the distal end 1a of the optical fiber 1 to slide on the grinding flat surface portion 5b whereupon the distal end 1a of the optical fiber 1 is inclined in the second inclining direction to cause the contact angle between the distal end 1a of the optical fiber 1 and the grinding flat surface portion 5b to form the given contact angle θ for thereby permitting relative movement of the optical fiber 1 to be performed in the second travel direction to cause the distal end 1a of the optical fiber 1 to slide on the grinding flat surface portion 5b, no excessive degree of flexing occurs in the optical fiber 1 and, therefore, no probability occurs in breakage of the optical fiber 1 whereby a strong reaction force can be determined to be exerted to the distal end 1a of the optical fiber 1 and a grinding efficiency can be improved to increase a yield while enabling a wedge to be processed at a high processing efficiency to improve a performance of the wedge-shaped optical fiber, resulting in a capability of remarkable reduction in manufacturing costs.

Further, according to the processing method of the presently filed embodiment, since the grinding film 5 has a trapezoid shape, it is possible for a grinding-processing point to smoothly shift to cause the distal end 1a of the optical fiber 1 to be slightly ground in the curved shape at a time, thereby enabling a semi-cylindrical curved lens, with a microscopic curvature radius R, to be formed on the distal end 1a of the optical fiber 1.

Next, referring to FIG. 9, a wedge-shaped optical fiber processing method of a fourth embodiment according to the present invention is described below. FIG. 9 is a side view illustrating a schematic structure of a processing apparatus for carrying out the wedge-shaped optical fiber processing method of the fourth embodiment of the present invention.

A wedge-shaped optical fiber processing apparatus 400 of the presently filed embodiment differs from the third embodiment in that the grinding film 5 and the grinding stand 6, which are trapezoid in the third embodiment shown in FIG. 7, are replaced with a flat grinding film 53 and grinding stand 63 to enable the moving mechanism 9Z for vertically moving the rotating mechanism 7 to be guided along the guide mechanism 9a, and the other structure and operation are similar to those of the third embodiment with the exception in that the moving mechanism 8X is mounted on the guide mechanism 8a on which the moving mechanism 9Z and the guide mechanism 9a are located, with like component parts bearing the same reference numerals. Further, the wedge-shaped optical fiber processing apparatus 400 is equipped with a control section 4000 that, in addition to control of operations of the rotating mechanism 7 and the moving mechanism, control operation of the moving mechanism 9Z.

The wedge-shaped optical fiber processing method of the presently filed embodiment shown in FIG. 9 contemplates to achieve vertical movement of the moving means 9Z for performing the grinding operation of the wedge-shaped distal end portion 3 defined by the pair of tapered surfaces 2a, 2b by the use of the first and second grinding slanted surface portions 5a, 5c of the grinding film 53 shown in FIG. 7, that is, the formation of the curvature surface 3a, with the microscopic curvature radius R, on the wedge-shaped distal end portion 3 formed through grinding by the first and second grinding slanted surface portions 5a, 5c of the grinding film 5 shown in FIG. 7.

Here, a grinding region 5b2 in a length M on the grinding film 53 corresponds to the grinding flat surface portion 5b in FIG. 7 and serves as the first grinding flat surface portion 5b. Likewise, a grinding region 5d in a right side length M1 on the grinding film 53 corresponds to the first grinding slanted surface portion 5a in FIG. 7 and serves as the second grinding flat surface portion 5b. Similarly, a grinding region 5e in a left side length M1 on the grinding film 53 corresponds to the second grinding slanted surface portion 5c in FIG. 7 and serves as the third grinding flat surface portion 5e.

More particularly, the presently filed embodiments concerns the reciprocating movement to be implemented a plural number of times wherein, when remaining in the second grinding flat surface portion 5d, the rotating mechanism 7 carrying the optical fiber holder section 4 holding the optical fiber 1 is vertically moved upward by the moving mechanism 9Z in a direction as shown by an arrow A11 and, starting from such an upward position remaining in the area corresponding to the second grinding flat surface portion 5d, the rotating mechanism 7 is progressively lowered in a direction as shown by an arrow A12 and moved to in a first travel direction as shown by an arrow A13 to cause the distal end 1a of the optical fiber 1 to progressively slide on the second grinding flat surface portion 5d and to be slightly ground by a minimal quantity at a time whereupon, when the moving mechanism 9Z passes through the second grinding flat surface portion 5d to an area corresponding to the first grinding flat surface portion 5d, the rotating mechanism 7 is moved closest to the grinding film 53 to cause the distal end 1a of the optical fiber to slide on the first grinding flat surface portion 5b2 for permitting the distal end 1a of the optical fiber 1 to be formed with the curved is surface with the microscopic curvature radius R and, when the moving mechanism 9Z further travels in a direction as shown by an arrow A14 and passes through the first grinding flat surface portion 5b to an area corresponding to the third grinding flat surface portion 5e, the rotating mechanism 7 is gradually moved upward in a direction as shown by an arrow A15 and horizontally moved to allow the distal end 1a of the optical fiber 1 to slide on the third grinding flat surface portion 5e to be ground by a minimal quantity at a time, and wherein operation is similarly carried out in an opposite direction, that is, operation is carried out in a lowering direction as shown by an arrow A16 and in a second travel direction shown by arrows A17, 18, thereby processing the distal end of the optical fiber 1 to be formed in the wedge shape.

More particularly, the moving mechanism 8X on which the rotating mechanism 7 is mounted is moved to a position (x0, z0) on the second grinding flat surface portion 5d, and the rotating mechanism 7 is raised by the moving mechanism 9Z to a position (x0, z1) whereupon the optical fiber 1 is mounted to the optical fiber holder section 4. Then, an upper portion of the optical fiber 1 is inclined at an angle α by the rotating mechanism 7 in the first travel direction as shown by the arrow A13. Subsequently, the moving mechanism 8X is gradually lowered, while moving the same in the first travel direction, to cause the distal end 1a of the optical fiber 1 to be progressively brought into pressured contact with the second grinding flat surface portion 5d, thereby causing the distal end 1a of the optical fiber 1 to be flexed at a progressively increased angle. And, at a position (x3, z0) where the contact angle between the distal end 1a of the optical fiber 1 and the first grinding flat surface portion 5b2 is θ, the lowering movement of the moving mechanism 9Z is interrupted and the distal end 1a of the optical fiber 1 is held at a given height.

Then, at a time instant when the moving mechanism 8X is further horizontally moved in the first travel direction as shown by the arrow A14 and distal end 1a of the optical fiber 1 is moved to a position (x2, z0) on the third grinding flat surface portion 5e, the rotating mechanism 7 is actuated to cause the upper portion of the optical fiber 1 to be gradually rotated in the opposite direction while progressively raising the moving mechanism 9Z in the direction as shown by the arrow A15. As a result, the contact point (that is, the point at which grinding is processed) between the distal end 1a of the optical fiber 1 and the third grinding flat surface portion 5e progressively shifts to the tip center side of the distal end 1a of the optical fiber 1 to allow the distal end 1a of the optical fiber 1 to be slightly ground in the curved surface at a time.

Thereafter, if the moving mechanism 9Z is further raised, the flexing of the distal end 1a of the optical fiber 1 is progressively released and, finally, the distal end 1a of the optical fiber 1 separates from the third grinding flat surface portion 5e (at a position (x4, z1)). Then, if the upper portion of the optical fiber 1 is rotated by the rotating mechanism 7 in the opposite direction at the angle $-2\alpha$, the optical fiber 1 is held under the condition inclined at the angle $-2\alpha$ with respect to the vertical axis.

Thus, under the condition where the optical fiber 1 is held in the inclined state, the moving mechanism 9Z is gradually lowered in the direction as shown by the arrow A16 while moving the moving mechanism 8X along the guide mechanism 8a in the second travel direction as shown by the arrow A17 from the leftward area of the grinding film 53. This causes the distal end 1a of the optical fiber 1 to be progressively brought into pressured contact with the grinding film 53. By similarly implementing the reciprocating movement a plural number of times, for instance, several tens times, which involve movements in the first and second travel directions as well as raising/lowering movements, the distal end 1a of the optical fiber 1 is ground in symmetry by the minimal quantity at a time, thereby forming the pair of tapered surfaces 2a, 2b formed with the distal tip with the vertical angle 2θ having the curvature surface 3a with the microscopic curvature radius R.

Also, while the presently filed embodiment has been described with reference to a case where the grinding film 53 is flat, the present invention is not limited thereto and the grinding film 53 may have a concave surface or a convex surface, depending on the objective. In this case, the moving mechanism 9Z may be controllably moved upward or downward depending on a particular shape of the grinding film 53 to enable the optical holder section 4 to travel relative to the grinding film 53 in parallel thereto and, so, it is possible to obtain the same effects as those of the case where the grinding film 53 is flat. Additionally, the moving mechanism 9Z may be controlled in a way to cause the optical fiber holder section 4 and the grinding film 53 to be intentionally displaced from the horizontal travel relative to one another such that a slanted configuration of the wedge shape is formed in a curved surface or intentionally formed in asymmetry for a particular application to form a wedge-shaped optical fiber with a deflected optical axis. As set forth above, the presently filed embodiment is able to move the moving mechanism 9Z in a cooperative relationship with the rotating mechanism 7 and the moving mechanism 8X for remarkably increasing a function of the processing apparatus to achieve processing of various shapes.

Moreover, it is clear that although such horizontal and separating movements and the rotating movement of the optical fiber holder section 4 and the grinding stand 63 relative to one another are controlled by the control section 4000, there is no need for a complicated control algorithm in order for controlling such movements.

As described above, according to the presently filed embodiment, since the reciprocating movement is consecutively implemented a plural number of times wherein the optical fiber, while held in the given protruding length L, and the grinding film 53 are relatively moved to allow the optical fiber 1 and the grinding film 53 to separate from one another and, while inclining the optical fiber 1 in the first inclining direction and moving the optical fiber 1 and the grinding film 53 relative to one another, the optical fiber 1 and the grinding film 53 are progressively moved closer to one another to cause the distal end 1a of the optical fiber 1 to be progressively brought into pressured contact with the grinding film 53 such that, when the contact angle relative to the grinding film 53 falls in the given contact angle θ, the approaching movement is interrupted to allow relative movement to be performed only in the first travel direction whereby the grinding film 53 and the optical fiber 1 are moved relative to one another so as to permit the distal end 1a of the optical fiber 1 to slide on the grinding film 53 and, subsequent to the sliding movement for the given distance, the optical fiber 1 is inclined in the second inclining direction to be similarly and relatively moved in the second travel direction opposite to the first travel direction, no large flexing occurs in the optical fiber 1 and, hence, no breakage of the optical fiber 1 takes place whereby the reaction force to be exerted to the optical fiber 1 can be set in an increased degree to improve a grinding efficiency and a high yield can be obtained while enabling a wedge shape processing to be performed with a high processing efficiency and improving a performance of a wedge-shaped optical fiber, resulting in a remarkable reduction in manufacturing costs.

Next, referring to FIG. 10, a wedge-shaped optical fiber processing method of a fifth embodiment according to the present invention is described below. A processing apparatus 500 of the presently filed embodiment differs from the third embodiment in that the flat film 53 and the grinding stand 63 are used as the trapezoid grinding film 5 and the grinding film 6 in the third embodiment shown in FIG. 7 and in that the rotating mechanism 7, to which the optical fiber holder section 4 holding the optical fiber 1 is mounted, is arranged to rotate clockwise or counterclockwise as shown by arrows A19, A20 at a greater rotational angle, and is similar in other structure and operation to the third embodiment, with like component parts bearing the same reference numerals. Also, the wedge-shaped optical fiber processing apparatus 500 includes a control section 5000 that controls operations of the rotating mechanism 7 and the moving mechanism 8X.

Figure 10:
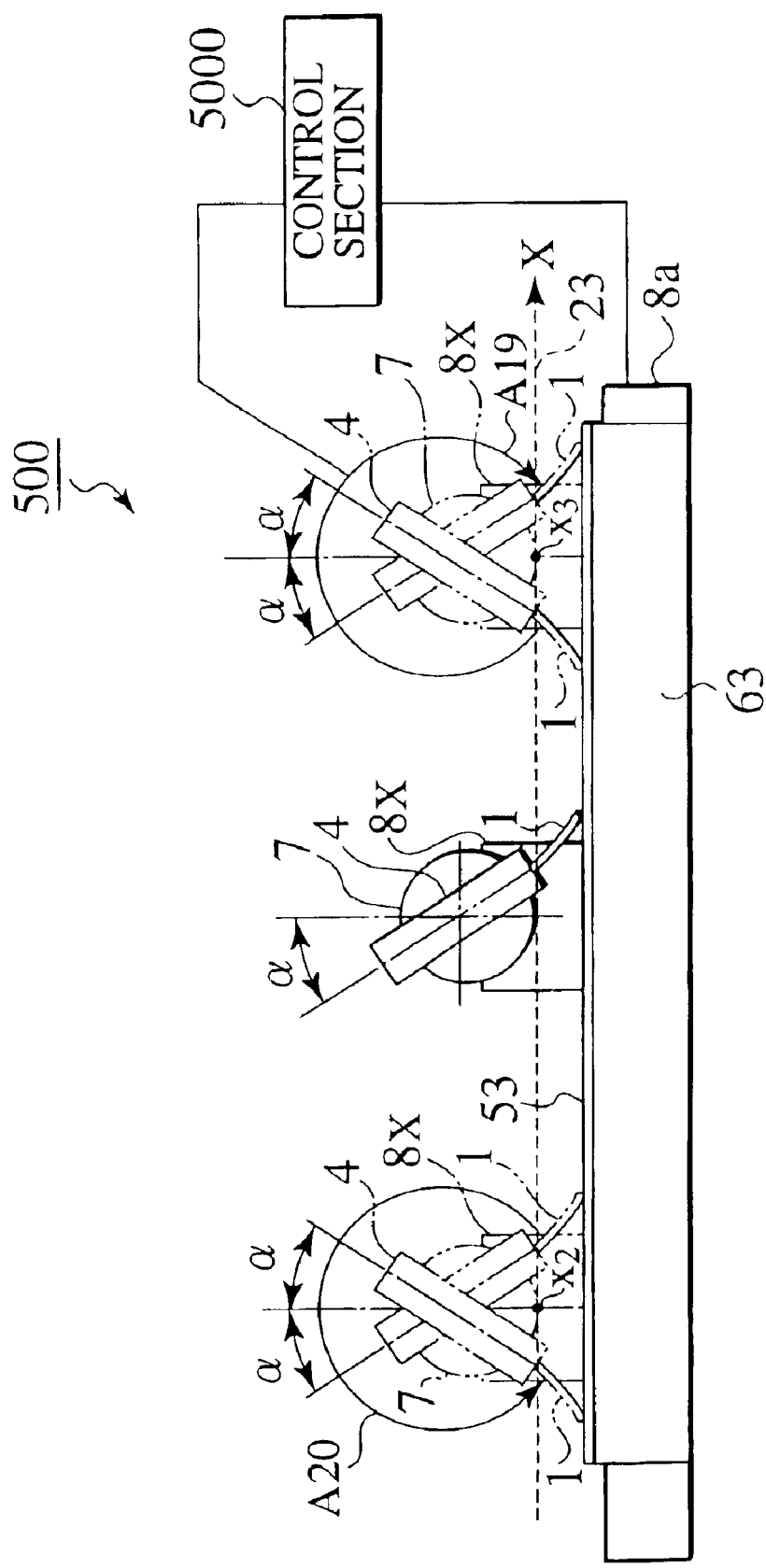
FIG. 10 is a side view illustrating a schematic structure of a processing apparatus for carrying out a wedge-shaped optical fiber processing method of a fifth embodiment according to the present invention.

To describe operation of the embodiment shown in FIG. 10, first, the moving mechanism 8X is moved toward one side of the grinding film 53, that is, rightward in FIG. 10 and, in a position x3, the optical fiber holder section 4 is greatly rotated by the rotating mechanism 7 to allow the optical fiber 1 to be mounted to the optical fiber holder section 4 such that the distal end 1a of the optical fiber 1 is retracted to an extent where the distal end 1a of the optical fiber 1 is held in non-contact with the grinding film 53.

Next, an upper portion of the optical fiber 1 is rotated clockwise as shown by the arrow A19 by the rotating mechanism 7 to permit the optical fiber 1 to be inclined at an angle α in a first travel direction orientated leftward in FIG. 10 for thereby causing the distal end 1a of the optical fiber 1 to be brought into pressured contact with the grinding film 53.

Also, the contact angle between the distal end 1a of the optical fiber 1 and the grinding film 53 is settled to be θ in the method described with reference to FIG. 7.

The moving mechanism 8X is further horizontally moved in the first travel direction and, when the distal end 1a of the optical fiber 1 comes to the other side of the grinding film 53, that is, a position x2 in FIG. 10, as the rotating mechanism 7 is rotated counterclockwise at an angle of 360°−2α as shown by an arrow A20, the optical fiber 1 takes a state, inclined at an angle −α with is respect to a vertical axis, at which the contact angle between the distal end 1a of the optical fiber 1 and the grinding film 53 becomes −θ. Then, the moving mechanism 8 is horizontally moved in a second travel direction, opposite to the first travel direction, to perform the same operation as that performed in the first travel direction. Repeatedly carrying out the reciprocating operations in the first and second travel directions enables the distal end 1a of the optical fiber 1 to be formed with a pair of tapered surfaces 2a, 2b with a vertical angle of 2θ.

Further, it is clear that while the relative, horizontal and rotational movements of the optical fiber holder section 4 and the grinding stand 63 are controlled by the control section 5000, when controlling such movements, there is no need for a complicated control algorithm.

As set forth above, according to the presently filed embodiment, since the operations for moving the grinding film 53 and the optical fiber 1 to allow the optical fiber 1 to be inclined and to cause the distal end 1a of the optical fiber 1 to slide on the grinding film 53 are repeatedly implemented a plural number of times in the first and second inclining directions and the first and second travel directions, no great flexing occurs in the optical fiber 1 to consequently avoid breakage of the optical fiber 1 and, so, the reaction force to be imparted to the distal end 1a of the optical fiber 1 can be settled to an increased value for improving a grinding efficiency and yield to enable a wedge-processing with a high processing efficiency, resulting in improvement in a performance of a wedge-shaped optical fiber while enabling remarkable reduction in manufacturing costs.

Now, referring to FIG. 11, a wedge-shaped optical fiber processing method of a six embodiment according to the present invention is described below. A wedge-shaped optical fiber processing apparatus 600 of the presently filed embodiment differs only in that the moving mechanism 8X in the embodiments shown in FIG. 7 or FIG. 10 is dispensed with to avoid the horizontal movement and, instead thereof, an oppositely placed V-shaped grinding film 54 is used as the grinding surface to allow the optical fiber 1 to be swayed rightward and leftward in the figure to cause the distal end 1a of the optical fiber 1 to be processed in a wedge shape, and has the same component elements with the exception that the grinding film and the grinding stand bear reference numerals 54 and 64, respectively, and further, the rotating mechanism 7 is mounted to a mount stand 10, with like component parts bearing the same reference numerals. The grinding film 54 is composed of a grinding sheet coated with an optical abrasive such as, for instance, silica, with the grinding film 54 being adhered to an angular grinding stand 64. In addition, the wedge-shaped optical fiber processing apparatus 600 is equipped with a control section 6000 that controls operations of the rotating mechanism 7 and the mount stand 10.

Figure 11:
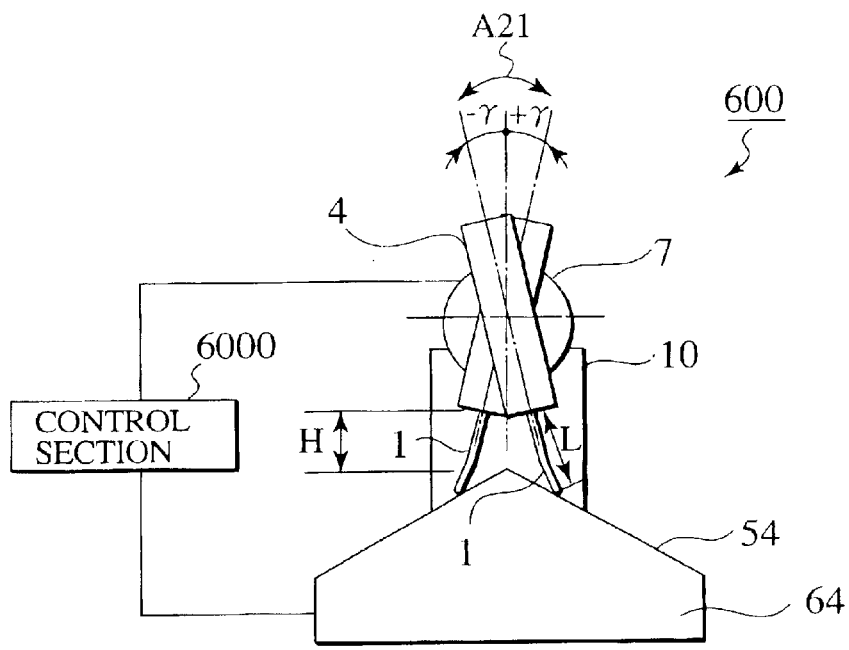
FIG. 11 is a side view illustrating a schematic structure of a processing apparatus for carrying out a wedge-shaped optical fiber processing method of a sixth embodiment according to the present invention.

Also, in the processing method of the presently filed embodiment shown in FIG. 10, while only the pair of tapered surfaces 2a, 2b of the distal end 1a of the optical fiber 1 are ground and the wedge shaped distal end portion 3 with the microscopic curvature radius R is not formed, the presently filed embodiment shown in FIG. 11 is enabled to form the curvature surface 3a at the wedge-shaped distal end portion 3.

In the presently filed embodiment, suppose a distance between an apex of the grinding film 54 and the optical fiber holder section 4 is H, the optical fiber 1 is mounted to the optical fiber holder section 4 such that a protruding length L of the optical fiber 1 is longer than the distance H. Under such a condition, the rotating mechanism 7 is rotated to symmetrically sway the distal end 1a of the optical fiber 1 at an angle ±γ. The sway angle ±γ in this operation is suffice to have a value to permit the distal end 1a of the optical fiber 1 to separate from the grinding film 54 to some extent. By so doing, the distal end 1a of the optical fiber 1 is ground in the same manner as those described in conjunction with the various embodiments set forth above, resulting in formation of a curvature surface 3a with a microscopic curvature radius R.

Further, while such relative rotating movement between the optical fiber holder section 4 and the grinding stand 64 is controlled by the control section 6000, it is clear that, when controlling such movements, there is no need for a complicated control algorithm.

Furthermore, although the presently filed embodiment has been described with reference to a case where the grinding film 54 has an angle shape, it is of course that the present invention is not restrictive and may be possible to be carried out in other case where the grinding film 64 has a convex cross section such as circular arc, parabolic and elliptical shapes.

As set forth above, according to the presently filed embodiment, since the is optical fiber 1 is held at the inclined angle in an area above the apex of the angular grinding film 54 and the optical fiber 1, which is held in a protruding state in a given length L above the apex of the angular grinding film, is swayed at a given sway angle γ about a center above the apex of the grinding film 54 a plural number of times, no great flexing occurs in the optical fiber 1 to consequently avoid breakage of the optical fiber 1 and, so, the reaction force to be imparted to the distal end 1a of the optical fiber 1 can be settled to an increased value for improving a grinding efficiency and yield to enable a wedge-processing with a high processing efficiency, resulting in improvement in a performance of a wedge-shaped optical fiber F while enabling remarkable reduction in manufacturing costs.

Figure 12A:
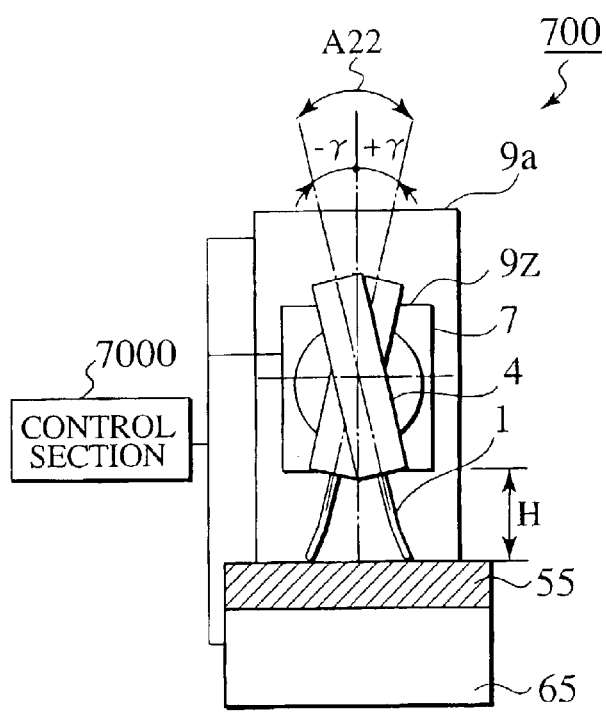
FIG. 12A is a side view illustrating a schematic structure of a processing apparatus for carrying out a wedge-shaped optical fiber processing method of a seventh embodiment according to the present invention.

Next, referring to FIG. 12A, a wedge-shaped optical fiber processing method of a seventh embodiment according to the present invention is described below. A wedge-shaped optical fiber processing apparatus 700 of the presently filed embodiment features that a moving mechanism 9Z, for vertically moving the rotating mechanism of the previous embodiment shown in FIG. 11, is enabled to be guided by a guide mechanism 9a and, additionally, a control section 7000 is provided for controlling operation of the rotating mechanism 7, the moving mechanism 9Z and the guide mechanism 9a. Further, a grinding film 55 is formed in a flat configuration and, thus, it is structured such that not only a convex shape such, an angle configuration, but also a flat configuration may be utilized. Further, in a case where the rotating mechanism 7, to which the holder 4 mounted with the optical fiber 1 is fixedly mounted like in FIG. 11, is rotated to cause the distal end 1a of the optical fiber 1 to symmetrically sway at an angle ±γ, a distance H between the optical fiber holder section 4, carrying the optical fiber 1, and the grinding film 55 is varied by the moving mechanism 9Z in dependence on the angle γ as shown in FIG. 12B, that is, the rotating mechanism 7 is vertically moved by the moving mechanism 9Z, thereby contemplating to achieve the same function as that of the embodiment shown in FIG. 11 even through the use of the flat grinding film 55.

Figure 12B:
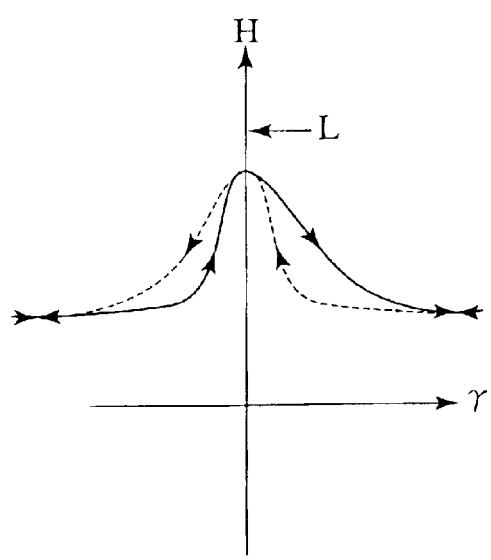
FIG. 12B is a graph illustrating a distance H in terms of a sway angle $\gamma$.

That is, while the optical fiber 1 is mounted to the optical fiber holder section 4 and the rotating mechanism 7 is rotated to effectuate a symmetric pendulum swinging of the distal end 1a of the optical fiber 1 at the angle ± γ, the position, that is, the distance H of the moving mechanism 9Z is controlled as shown in FIG. 12B in dependence on the sway angle γ in such operations.

More particularly, control is executed such that as an absolute value of the sway angle γ decreases to zero, the optical fiber 1 is raised by the moving mechanism 9Z and, as the absolute value of the sway angle γ increases, the optical fiber 1 is lowered. Such cooperative movements between the rotating mechanism 7 and the moving mechanism 9Z avoid the optical fiber 1 from being suffered from an excessively large flexing stress and enable the distal end 1a of the optical fiber 1 to be exerted with a substantially uniform load over entire operations of swaying movements. Also, since, if the grinding film 55 is comprised of thick and soft material, such as those used in buffing and polishing, an excessive flexing of the optical fiber 1 is alleviated due to depression of the grinding film 55, it becomes sufficient for the raising control of the moving mechanism 9Z to be roughly implemented and the contact surface area between the grinding film 55 and the distal end 1a of the optical fiber 1 increases, thereby enabling an increase in a grinding efficiency and an improvement in a processing efficiency.

Further, although such relative vertical movement between the optical fiber holder section 4 and the grinding stand 65 is controlled by the control section 7000, it is clear that, when controlling such movements, there is no need for a complicated control algorithm.

As set forth above, according to the presently filed embodiment, since the separating and synchronous swaying operations are carried out a plural number of times to allow the optical fiber 1 and the grinding film 55 to be moved away from and closer to one another such that, in the swaying operations in which the optical fiber 1 is swayed about a center of a vertical condition of the optical fiber 1 passing from the first inclining direction toward the second inclining direction through the vertical condition and, oppositely, passing from the second inclining direction toward the first inclining direction through the vertical condition during the vertical phase of the optical fiber 1, the optical fiber 1 and the grinding film 55 are separate in the maximum distance whereas, during the first and second inclining phases, the optical fiber 1 and the grinding film 55 are closest, no great flexing occurs in the optical fiber 1 to consequently avoid breakage of the optical fiber 1 and, so, the reaction force to be imparted to the distal end 1a of the optical fiber 1 can be settled to an increased value for improving a grinding efficiency and yield to enable a wedge-processing with a high processing efficiency, resulting in improvement in a performance of a wedge-shaped optical fiber while enabling remarkable reduction in manufacturing costs.

It is needless to say that, while the various embodiments set forth above have been described with reference to an example where, when using the moving mechanism 8X and the moving mechanism 9Z, the optical fiber 1 is moved to, either one (or both) of the optical fiber 1 and the grinding stand 65 may be moved and it is essential for the optical fiber and the grinding stand 65 to be relatively moved. Also, it is needless to say that, although the number of pieces of the optical fibers to be processed has been described in conjunction with an example of one piece, the holder may be so arranged as to enable a large number of optical fibers to be held for thereby enabling the wedge-processing of the large number of optical fibers at the same time in an easy manner. Moreover, it is needless to say that a moving mechanism 10Y, which enables the optical fiber to travel in a direction intersecting the moving mechanism 8X and the moving mechanism 9Z, may be provided to allow the moving mechanism 10Y to be slightly fed, during the returning step of grinding operation, for a travel in a direction intersecting the travel direction of the optical fiber for thereby achieving uniformly progressed deterioration in the grinding surface.

Further, while the present invention has been described in connection with an example in which the relative movements between the grinding surface and the optical fiber are performed in the horizontal direction, it is needless to say that the relative movements between the grinding surface and the optical fiber may be carried out in either a longitudinal direction or in a slanted direction.

While, in the above various embodiments, the grinding film (the grinding surface) and the grinding stand have been described as being separate from one another, it is to be noted that the grinding surface forms a more essential component element. Although the grinding stand plays a role as a base for forming the grinding surface and is dispensable in a case where, for instance, a grinding sheet is adhered, since in essence, it is suffice for the grinding surface with a desired shape and rigidity to be formed, it is needless to say that, for instance, when using a grindstone in a suitable size, its surface forms a grinding surface and thus the grind stand can be dispensed with. Also, it is needless to say that, although the grinding surface has been described in connection with an example in which the grinding sheet is adhered to the grinding stand, the grinding stand may have a surface formed of liquid, containing colloidal silica, and powder which are in dispersed state and, in this case, the surface of the grinding stand corresponds to the grinding surface.

Further, in the various embodiments described above, while a locus of the reciprocating movements between the optical fiber 1 and the grinding surface may be linear or curved depending on the shape of the grinding surface, in short, the locus may be determined so as to allow a distance connecting between a start position and a terminated position of the reciprocating movement to be shortest. That is, it is suffice that the locus of the reciprocating movements may geometrically describe a geodetic line.

The present disclosure relates to subject matter contained in Japanese Patent Application No. 2002-121314 filed on Apr. 23, 2002 and No. 2002-145298 filed on May 20, 2002, of which is expressly incorporated herein by reference in its entirety.

What is claimed is:

1. A processing method of a distal end of an optical fiber, comprising:

holding an optical fiber to allow a distal end of the optical fiber to serve as a free end; and repeatedly implementing reciprocating movement a plural number of times to cause the distal end of the optical fiber and a grinding surface of a grinding member to slide relative to one another while keeping the distal end of the optical fiber in contact with the grinding surface of the grinding member to cause the distal end of the optical fiber to be flexed in a direction opposite to a direction in which the distal end of the optical fiber moves.

2. The processing method according to claim 1, wherein the reciprocating movement is implemented to allow a quantity to be ground in a forward direction to be equal to a quantity to be ground in a rearward direction.

3. The processing method according to claim 1, wherein the reciprocating movement describes a locus of a geodetic line.

4. The processing method according to claim 1, wherein, during the reciprocating movement, a vertical distance between a position in which the optical fiber is held and the grinding surface of the grinding member is continuously varied to continuously vary a contact angle between the distal end of the optical fiber and the grinding surface of the grinding member.

5. The processing method according to claim 1, further including a preliminary step of coating resilient raw material on the optical fiber.

6. The processing method according to claim 1, wherein the grinding surface of the grinding member has a limited given length with respect to a direction along which the reciprocating movement is performed.

7. The processing method according to claim 1, wherein the reciprocating movement is implemented such that a vertical distance between a position in which the optical fiber is held and the grinding surface of the grinding member is symmetric with respect to a center of the reciprocating movement.

8. The processing method according to claim 7, wherein the reciprocating movement is implemented such that the vertical distance between the position in which the optical fiber is held and the grinding surface of the grinding member is constant in a given length from the center of the reciprocating movement.

9. A processing apparatus of a distal end of an optical fiber, comprising:

a holding member holding an optical fiber to allow a distal end of the optical fiber to serve as a free end;

a grinding member having a grinding surface for grinding the distal end of the optical fiber; and a reciprocating movement controlling section that controls reciprocating movement to be performed a plural number of times to cause the distal end of the optical fiber and the grinding surface of the grinding member to slide relative to one another while keeping the distal end of the optical fiber in contact with the grinding surface of the grinding member to allow the distal end of the optical fiber to be flexed in a direction opposite to a direction in which the distal end of the optical fiber moves.

10. The processing apparatus according to claim 9, wherein the reciprocating movement controlling section controls operations of the holding member and the grinding member to allow a quantity to be ground in a forward direction to be equal to a quantity to be ground in a rearward direction.

11. The processing apparatus according to claim 9, wherein the reciprocating movement controlling section controls such that a locus of the reciprocating movement matches a geodetic line.

12. The processing apparatus according to claim 9, wherein the reciprocating movement controlling section controls the reciprocating movement so as to vary a vertical distance between a position in which the optical fiber is held and the grinding surface of the grinding member for thereby varying a contact angle between the distal end of the optical fiber and the grinding surface of the grinding member.

13. The processing apparatus according to claim 9, wherein the optical fiber is coated with resilient raw material.

14. The processing apparatus according to claim 9, wherein the grinding surface of the grinding member has a limited given length given in a direction along which the reciprocating movement is performed.

15. The processing apparatus according to claim 9, wherein the grinding surface of the grinding member has a shape such that a vertical distance between a position in which the optical fiber is held and the grinding surface of the grinding member is symmetric with respect to a center of the reciprocating movement.

16. The processing apparatus according to claim 15, wherein the grinding surface of the grinding member has a convex shape or a trapezoid shape in which a shape of the grinding surface along a direction of the reciprocating movement is symmetric with respect to a center of the reciprocating movement.

17. A processing apparatus of a distal end of an optical fiber, comprising:

a holding member holding an optical fiber to allow a distal end of the optical fiber to serve as a free end;

a grinding member having a grinding surface for grinding the distal end of the optical fiber;

a contacting member compelling the distal end of the optical fiber to be brought into contact with the grinding surface; and a reciprocating movement member that controls reciprocating movement to be performed a plural number of times to cause the distal end of the optical fiber and the grinding surface of the grinding member to slide relative to one another while keeping the distal end of the optical fiber in contact with the grinding surface of the grinding member to allow the distal end of the optical fiber to be flexed in a direction opposite to a direction in which the distal end of the optical fiber moves.

18. A processing method of a distal end of an optical fiber, comprising:

holding an optical fiber in a protruding state in a given length;

inclining the held optical fiber at a given angle in a first inclining direction with respect to a grinding surface such that a contact angle, defined when a distal end of the held optical fiber is held in pressured contact with the grinding surface to cause the optical fiber to be flexed, between the optical fiber and the grinding surface falls in a given contact angle;

moving the grinding surface and the optical fiber relative to one another so as to cause the distal end of the optical fiber to slide on the grinding surface for a given distance in a first travel direction corresponding to the first inclining direction under a condition where the optical fiber is inclined in the first inclining direction;

inclining the held optical fiber at a given angle in a second inclining direction, subsequent to a sliding motion for the given distance, such that the contact angle, defined when the distal end of the held optical fiber is held in pressured contact with the grinding surface to cause the optical fiber to be flexed during an inclining motion of the held optical fiber with respect to the grinding surface in the second inclining direction opposite to the first inclining direction, between the optical fiber and the grinding surface falls in a given contact angle;

moving the grinding surface and the optical fiber relative to one another so as to cause the distal end of the optical fiber to slide on the grinding surface for a given distance in a second travel direction corresponding to the second inclining direction under a condition where the optical fiber is inclined in the second inclining direction; and repeatedly moving the grinding surface and the optical fiber relative to one another a plural number of times in the first and second travel directions.

19. The processing method according to claim 18, wherein the grinding surface has a trapezoid shape, and both end portions of the grinding surface corresponding to both terminal portions of the given distance are inclined downward.

20. A processing method of a distal end of an optical fiber, comprising:

holding an optical fiber in a protruding state in a given length;

moving the optical fiber and a grinding surface relative to one another so as to cause a distal end of the held optical fiber and the grinding surface to separate from one another;

inclining the held optical fiber at a given angle in a first inclining direction with respect to the grinding surface under a separated state of the held optical fiber such that a contact angle, defined when the distal end of the held optical fiber is held in pressured contact with the grinding surface to cause the optical fiber to be flexed, between the optical fiber and the grinding surface falls in a given contact angle;

moving the grinding surface and the optical fiber relative to one another to allow the distal end of the optical fiber to slide on the grinding surface for a given distance such that the optical fiber and the grinding surface are progressively made closer to cause the distal end of the optical fiber to be progressively brought into pressured contact with the grinding surface while, under a condition where the optical fiber is inclined in the first inclining direction, performing relative movement between the grinding surface and the optical fiber in a first travel direction corresponding to the first inclining direction, whereby when the contact angle between the optical fiber and the grinding surface falls in the given contact angle, approaching movement is interrupted to allow relative movement between the optical fiber and the grinding surface to be performed only in the first travel direction;

moving the optical fiber and the grinding surface relative to one another, subsequent to sliding motion for the given distance, so as to cause the distal end of the held optical fiber and the grinding surface to separate from one another;

inclining the held optical fiber at a given angle relative to the grinding surface in a second inclining direction such that the contact angle, defined when the distal end of the held optical fiber is held in pressured contact with the grinding surface to cause the optical fiber to be flexed during inclining motion of the held optical fiber with respect to the grinding surface in the second inclining direction opposite to the first inclining direction, between the optical fiber and the grinding surface falls in a given contact angle;

moving the grinding surface and the optical fiber relative to one another to allow the distal end of the optical fiber to slide on the grinding surface for a given distance such that the optical fiber and the grinding surface are progressively made closer to cause the distal end of the optical fiber to be progressively brought into pressured contact with the grinding surface while, under a condition where the optical fiber is inclined in the second inclining direction, moving the grinding surface and the optical fiber relative to one another in a second travel direction corresponding to the second inclining direction, whereby when the contact angle between the optical fiber and the grinding surface falls in the given contact angle, approaching movement is interrupted to move the optical fiber and the grinding surface relative to one another only in the second travel direction; and consecutively and repeatedly implementing the separating movement, the inclining movements in the first and second inclining directions and the relative movements in the first and second travel directions a plural number of times.

21. The processing method according to claim 18 or 20, wherein operations for inclining the optical fiber with respect to the grinding surface in the first and second inclining directions are achieved through rotations of a rotating mechanism.

22. A processing method of a distal end of an optical fiber, comprising:

holding an optical fiber in a protruding state in a given length;

inclining the held optical fiber at a given angle in a first inclining direction with respect to the grinding surface such that a contact angle, defined when a distal end of the held optical fiber is held in pressured contact with the grinding surface to cause the optical fiber to be flexed, between the optical fiber and the grinding surface falls in a given contact angle;

moving the grinding surface and the optical fiber relative to one another so as to cause the distal end of the optical fiber to slide on the grinding surface in first travel direction, corresponding to the first inclining direction, for a given distance under a condition where the optical fiber is inclined in the first inclining direction;

inclining the held optical fiber with respect to the grinding surface at a given angle in a second inclining direction, subsequent to sliding motion for the given distance, by rotating the held optical fiber in a direction from the first inclining direction toward the second inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle;

moving the grinding surface and the optical fiber relative to one another so as to cause the distal end of the optical fiber to slide on the grinding surface in second travel direction, corresponding to the second inclining direction, for a given distance under a condition where the optical fiber is inclined in the second inclining direction;

inclining the held optical fiber with respect to the grinding surface at a given angle in the first inclining direction, subsequent to sliding motion for the given distance, by rotating the held optical fiber in a direction from the second inclining direction toward the first inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle; and consecutively and repeatedly implementing the inclining motions in the first and second inclining directions and the relative movements in the first and second travel directions a plural number of times.

23. A processing method of a distal end of an optical fiber, comprising:

holding and inclining an optical fiber, in an area above an apex of an angular grinding surface, which is highest in the apex and has both side portions of the apex extend downward, in a protruding state in a given length such that, when swaying the optical fiber about a center of the upper area of the apex of the grinding surface, a distal end of the optical fiber is enabled to be held in abutting contact with slanted portions of the sliding surface; and swaying the held optical fiber at a given sway angle a plural number of times under the protruding state in the given length at the upper area of the apex of the grinding surface about the center of the upper area of the apex of the grinding surface.

24. A processing method of a distal end of an optical fiber, comprising:

holding an optical fiber in an area above a flat grinding surface in a vertical condition under a straightly hanging down state so as to allow a distal end of the optical fiber to be brought into a point contact or out of contact with a flat grinding surface;

inclining the held optical fiber at a given angle in a first inclining direction and lowering the held optical fiber for a given distance in the inclined state such that a length between a position, at which the optical fiber is held, and the distal end of the optical fiber is longer than a length between the position, at which the optical fiber is held, and the grinding surface; and repeatedly implementing approaching-separating-synchronous-swaying motion a plural number of times for moving the optical fiber and the grinding surface closer to or separate from one another such that, when the optical fiber is lowered for the given distance, the optical fiber is swayed about a center of the vertical condition of the optical fiber in a first inclining direction and a second inclining direction, opposite to the first inclining direction, through the vertical condition and in the second inclining direction and the first inclining direction through the vertical condition and, when the optical fiber remains in the vertical condition during the swaying movement, a distance between the optical fiber and the grinding surface is remotest whereas, when the optical fiber remains in first and second inclined conditions, the distance between the optical fiber and the grinding surface is closest.

25. A processing apparatus of a distal end of an optical fiber, comprising:

holding means for holding an optical fiber in a protruding state for a given length;

first inclining means for inclining the held optical fiber at a given angle in a first inclining direction with respect to a grinding surface such that a contact angle, defined when a distal end of the held optical fiber is brought into pressured contact with the grinding surface, between the optical fiber and the grinding surface falls in a given contact angle;

first relative motion means for operating the grinding surface and the optical fiber relative to one another so as to cause the distal end of the optical fiber to slide on the grinding surface for a given distance in a first travel direction corresponding to the first inclining direction under a condition where the optical fiber is inclined in the first inclining direction;

second inclining means for inclining the held optical fiber with respect to the grinding surface at a given angle in the second inclining direction, subsequent to sliding motion for the given distance, such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle;

second relative motion means for operating the grinding surface and the optical fiber relative to one another so as to cause the distal end of the optical fiber to slide on the grinding surface for a given distance in a second travel direction corresponding to the second inclining direction under a condition where the optical fiber is inclined in the second inclining direction; and repeating control means for controlling the first and second inclining means and the first and second relative motion means for repeatedly moving the grinding surface and the optical fiber relative to one another a plural number of times in the first and second travel directions.

26. The processing apparatus according to claim 25, wherein the grinding surface has a trapezoid shape, and both end portions of the grinding surface corresponding to terminals ends of the given distance are inclined downward.

27. A processing apparatus of a distal end of an optical fiber, comprising:

holding means for holding an optical fiber in a protruding state in a given length;

first separating means for moving the optical fiber and a grinding surface relative to one another so as to cause a distal end of the held optical fiber and the grinding surface to separate from one another;

first inclining means for inclining the held optical fiber at a given angle in a first inclining direction with respect to the grinding surface under a separated state of the held optical fiber such that a contact angle, defined when the distal end of the held optical fiber is held in pressured contact with the grinding surface to cause the optical fiber to be flexed, between the optical fiber and the grinding surface falls in a given contact angle;

first relative motion means for the grinding surface and the optical fiber relative to one another such that the optical fiber and the grinding surface are progressively made closer to cause the distal end of the optical fiber to be progressively brought into pressured contact with the grinding surface while, under a condition where the optical fiber is inclined in the first inclining direction, moving the grinding surface and the optical fiber relative to one another in a first travel direction corresponding to the first inclining direction whereupon, when the contact angle between the optical fiber and the grinding surface falls in the given contact angle, approaching movement is interrupted to allow relative movement to be preformed only in the first travel direction to cause the distal end of the optical fiber to slide on the grinding surface for a given distance;

second separating means for operating the optical fiber and the grinding surface relative to one another, subsequent to sliding motion for the given distance, so as to cause the distal end of the held optical fiber and the grinding surface to separate from one another;

second inclining means for inclining the held optical fiber at a given angle relative to the grinding surface in a second inclining direction such that the contact angle, defined when the distal end of the held optical fiber is held in pressured contact with the grinding surface to cause the optical fiber to be flexed during inclining motion of the held optical fiber with respect to the grinding surface in the second inclining direction opposite to the first inclining direction, between the optical fiber and the grinding surface falls in a given contact angle;

second relative motion means for the grinding surface and the optical fiber relative to one another such that the optical fiber and the grinding surface are progressively made closer to cause the distal end of the optical fiber to be progressively brought into pressured contact with the grinding surface while, under a condition where the optical fiber is inclined in the second inclining direction, moving the grinding surface and the optical fiber relative to one another in a second travel direction corresponding to the second inclining direction whereupon, when the contact angle between the optical fiber and the grinding surface falls in the given contact angle, approaching movement is interrupted to allow relative movement to be performed only in the second travel direction to cause the distal end of the optical fiber to slide on the grinding surface for a given distance; and repeating control means for controlling the first and second separating means, the first and second inclining means and the first and second relative motion means so as to consecutively and repeatedly implement the first and second separating motions, inclining motions in the first and second inclining directions and relative motions in the first and second travel directions a plural number of times.

28. The processing apparatus according to claim 25 or 27, wherein the first and second inclining means include rotating means for rotating the optical fiber to cause the same to be inclined in the first and second inclining means.

29. A processing apparatus of a distal end of an optical fiber, comprising:

holding means for holding an optical fiber in a protruding state in a given length;

first inclining means for inclining the held optical fiber at a given angle in a first inclining direction with respect to the grinding surface such that a contact angle, defined when a distal end of the held optical fiber is held in pressured contact with the grinding surface to cause the optical fiber to be flexed, between the optical fiber and the grinding surface falls in a given contact angle;

first relative motion means for operating the grinding surface and the optical fiber relative to one another so as to cause the distal end of the optical fiber to slide on the grinding surface in first travel direction, corresponding to the first inclining direction, for a given distance under a condition where the optical fiber is inclined in the first inclining direction;

first rotating means for inclining the held optical fiber with respect to the grinding surface at a given angle in a second inclining direction, subsequent to sliding motion for the given distance, by rotating the held optical fiber in a direction from the first inclining direction toward the second inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle;

second relative motion means for operating the grinding surface and the optical fiber relative to one another so as to cause the distal end of the optical fiber to slide on the grinding surface in second travel direction, corresponding to the second inclining direction, for a given distance under a condition where the optical fiber is inclined in the second inclining direction;

second rotating means for inclining the held optical fiber with respect to the grinding surface at a given angle in the first inclining direction, subsequent to sliding motion for the given distance, by rotating the held optical fiber in a direction from the second inclining direction toward the first inclining direction to cause the distal end of the optical fiber to separate from the grinding surface such that, during inclining motion of the held optical fiber with respect to the grinding surface in the second inclining direction opposite to the first inclining direction, a contact angle, defined when the distal end of the held optical fiber is held in pressured contact with the grinding surface to cause the optical fiber to be flexed, between the optical fiber and the grinding surface falls in a given contact angle; and repeating control means for controlling the first and second rotating means and the first and second relative motion means so as to consecutively and repeatedly implement inclining motions in the first and second inclining directions and relative motions between the grinding surface and the optical fiber in the first and second travel directions a plural number of times.

30. A processing apparatus of a distal end of an optical fiber, comprising:

holding means for holding and inclining an optical fiber, in an area above an apex of an angular grinding surface, which is highest in the apex and has both side portions of the apex extend downward, in a protruding state in a given length such that, when swaying the optical fiber about a center of the upper area of the apex of the grinding surface, a distal end of the optical fiber is enabled to be held in abutting contact with slanted portions of the sliding surface; and swaying means for swaying the held optical fiber at a given sway angle a plural number of times under the protruding state in the given length at the upper area of the apex of the grinding surface about the center of the upper area of the apex of the grinding surface.

31. A processing apparatus of a distal end of an optical fiber, comprising:

holding means for holding an optical fiber in an area above a flat grinding surface in a vertical condition under a straightly hanging down state so as to allow a distal end of the optical fiber to be brought into a point contact or out of contact with a flat grinding surface;

inclining and lowering means for inclining the held optical fiber at a given angle in a first inclining direction and lowering the held optical fiber for a given distance in the inclined state such that a length between a position, at which the optical fiber is held, and the distal end of the optical fiber is longer than a length between the position, at which the optical fiber is held, and the grinding surface; and approaching-separating-synchronous-swaying means for repeatedly implementing approaching-separating-synchronous-swaying motion a plural number of times for moving the optical fiber and the grinding surface closer to or separate from one another such that, when the optical fiber is lowered for the given distance, the optical fiber is swayed about a center of the vertical condition of the optical fiber in a first inclining direction and a second inclining direction, opposite to the first inclining direction, through the vertical condition and in the second inclining direction and the first inclining direction through the vertical condition and, when the optical fiber remains in the vertical condition during the swaying movement, a distance between the optical fiber and the grinding surface is remotest whereas, when the optical fiber remains in first and second inclined conditions, the distance between the optical fiber and the grinding surface is closest.

* * * * *